United States Patent
Yoshikawa et al.

(10) Patent No.: US 12,270,991 B2
(45) Date of Patent: Apr. 8, 2025

(54) OPTICAL DEVICE, LINE-OF-SIGHT DETECTION DEVICE, RETINAL PROJECTION DISPLAY DEVICE, HEAD-MOUNTED DISPLAY, OPTOMETRIC DEVICE, USER-CONDITION ESTIMATION APPARATUS, DRIVER-ASSISTANCE SYSTEM, METHOD OF DETECTING DEGREE OF INCLINATION OF THREE-DIMENSIONAL OBJECT, AND LINE-OF-SIGHT DETECTION METHOD

(71) Applicants: Masato Yoshikawa, Kanagawa (JP); Suguru Sangu, Kanagawa (JP); Saori Yoshida, Miyagi (JP)

(72) Inventors: Masato Yoshikawa, Kanagawa (JP); Suguru Sangu, Kanagawa (JP); Saori Yoshida, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 527 days.

(21) Appl. No.: 17/653,302

(22) Filed: Mar. 3, 2022

(65) Prior Publication Data

US 2022/0299762 A1 Sep. 22, 2022

(30) Foreign Application Priority Data

Mar. 16, 2021 (JP) .................. 2021-042908
Jan. 13, 2022 (JP) .................. 2022-003943

(51) Int. Cl.
*G06F 3/01* (2006.01)
*G02B 27/00* (2006.01)
*G02B 27/01* (2006.01)

(52) U.S. Cl.
CPC ..... *G02B 27/0093* (2013.01); *G02B 27/0172* (2013.01); *G02B 2027/0138* (2013.01); *G02B 2027/014* (2013.01); *G02B 2027/0178* (2013.01)

(58) Field of Classification Search
CPC ............... G06F 3/013; G02B 27/0093; G02B 2027/0138
See application file for complete search history.

(56) References Cited

U.S. PATENT DOCUMENTS

2006/0262398 A1 11/2006 Sangu et al.
2020/0174564 A1 6/2020 Sangu et al.
(Continued)

FOREIGN PATENT DOCUMENTS

JP 2002-248104 9/2002
JP 2020-087200 6/2020

*Primary Examiner* — Ryan D Howard
(74) *Attorney, Agent, or Firm* — IPUSA, PLLC

(57) ABSTRACT

An optical device, a method of detecting the degree of inclination of a three-dimensional object, and a method of detecting a line of sight. The optical device includes a plurality of light emitters configured to irradiate an object with light, a detector configured to detect the light reflected by the object and output a signal based on the light reflected by the object, and circuitry configured to output data of a degree of inclination of the object obtained based on an output signal output from the detector. In the optical device, the light emitted from the light emitter is temporally modulated by a code having orthogonality, and the plurality of light emitters include a first light emitter and a second light emitter. In the optical device, the first light emitter emits the light at a timing different from a timing at which the second light emitter emits the light.

15 Claims, 10 Drawing Sheets

(56) References Cited

U.S. PATENT DOCUMENTS

2020/0278539 A1\* 9/2020 Petljanski ............... G06F 3/147
2020/0285058 A1 9/2020 Sangu et al.

\* cited by examiner

OPTICAL DEVICE, LINE-OF-SIGHT DETECTION DEVICE, RETINAL PROJECTION DISPLAY DEVICE, HEAD-MOUNTED DISPLAY, OPTOMETRIC DEVICE, USER-CONDITION ESTIMATION APPARATUS, DRIVER-ASSISTANCE SYSTEM, METHOD OF DETECTING DEGREE OF INCLINATION OF THREE-DIMENSIONAL OBJECT, AND LINE-OF-SIGHT DETECTION METHOD

CROSS-REFERENCE TO RELATED APPLICATIONS

This patent application is based on and claims priority pursuant to 35 U.S.C. § 119(a) to Japanese Patent Application Nos. 2021-042908 and 2022-003943, filed on Mar. 16, 2021, and Jan. 13, 2022, respectively, in the Japan Patent Office, the entire disclosures of which are hereby incorporated by reference herein.

BACKGROUND

Technical Field

Embodiments of the present disclosure relate to an optical device, a line-of-sight detection device, a retinal projection display device, a head-mounted display, an optometric device, a user-condition estimation apparatus, a driver-assistance system, a method of detecting the degree of inclination of a three-dimensional object, and a line-of-sight detection method.

Background Art

Optical devices are known in the art that optically detect the degree of inclination of an object such as an eye. From the viewpoint of safety, such an optical device may be required to irradiate the object with light having weak radiation intensity and to detect weak reflected light of the irradiated light from the object with high sensitivity.

As an optical device for detecting weak return light of irradiated light from an object, for example, a biological information measurement device is known in the art. In such biological information measurement devices, an optical exit that includes a pseudorandom noise sequence generator, a laser driver that outputs the amplitude of intensity of spread-spectrum light obtained as a result of amplitude shift keying (ASK) using the pseudorandom noise sequence generated by the pseudorandom noise sequence generator, and a semiconductor laser that is driven by the spread-spectrum output from the laser driver is provided for each one of two different wavelengths of light. In such a pseudorandom noise sequence, two different wavelengths of light exists separately, and the pseudorandom noise sequence generator is provided with a photodetector that is provided with a light detector that receives light reaching upon propagating through a live subject and generates an electric detection signal and an analog-to-digital (A/D) converter that receives a detection signal and performs analog-to-digital conversion on the received detection signal. Further, a correlation processor that includes a multiplier and an accumulator that accumulates the output from the multiplier is provided for each one of two different wavelengths of light. The multiplier of such a correlation processor receives the analog-to-digital converted detection signal output from the analog-to-digital converter and the pseudorandom noise sequence generated by the pseudorandom noise sequence generator, and multiplies the analog-to-digital converted detection signal by the pseudorandom noise sequence over at least one cycle for the inverse spread-spectrum light.

SUMMARY

Embodiments of the present disclosure described herein provide an optical device, a method of detecting the degree of inclination of a three-dimensional object, and a method of detecting a line of sight. The optical device includes a plurality of light emitters configured to irradiate an object with light, a detector configured to detect the light reflected by the object and output a signal based on the light reflected by the object, and circuitry configured to output data of a degree of inclination of the object obtained based on an output signal output from the detector. In the optical device, the light emitted from the light emitter is temporally modulated by a code having orthogonality, and the plurality of light emitters include a first light emitter and a second light emitter. In the optical device, the first light emitter emits the light at a timing different from a timing at which the second light emitter emits the light. The method of detecting the degree of inclination of the three-dimensional object includes irradiating an object with light, using a plurality of light emitters, detecting the light reflected by the object and outputting a signal based on the light reflected by the object, using a detector, and outputting data of a degree of inclination of the object obtained based on an output signal output from the detector. In the method of detecting the degree of inclination of the three-dimensional object, the light emitted from the light emitter is temporally modulated by a code having orthogonality, and the plurality of light emitters include a first light emitter and a second light emitter. In the method of detecting the degree of inclination of the three-dimensional object, the first light emitter emits the light at a timing different from a timing at which the second light emitter emits the light. The method of detecting the line of sight includes irradiating an object with light, using a plurality of light emitters, detecting the light reflected by the object and outputting a signal based on the light reflected by the object, using a detector, and outputting data of a degree of inclination of the object obtained based on an output signal output from the detector. In the method of detecting the line of sight, the light emitted from the light emitter is temporally modulated by a code having orthogonality, and the plurality of light emitters include a first light emitter and a second light emitter. In the method of detecting the line of sight, the first light emitter emits the light at a timing different from a timing at which the second light emitter emits the light.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 5A is a diagram illustrating encoding patterns according to an embodiment of the present disclosure.

FIG. 5B is a diagram illustrating the computation of inner products, according to an embodiment of the present disclosure.

Figure 1:
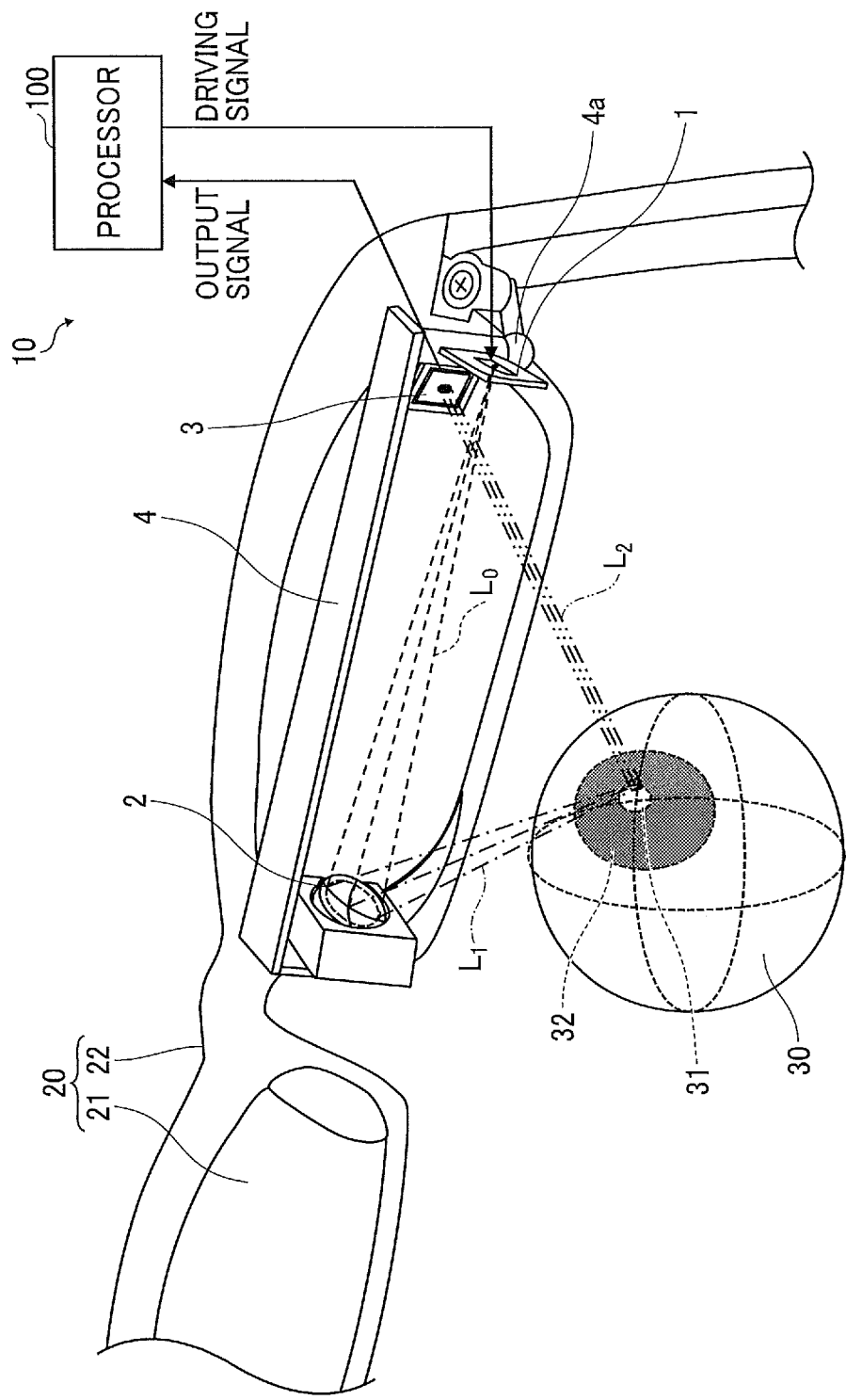
FIG. 1 is a diagram illustrating a configuration of a line-of-sight detection device according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific integrated circuits (ASICs), field-programmable gate arrays (FPGAs), computers or the like. These terms may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Embodiments of the present disclosure are described below with reference to the accompanying drawings. In the drawings, like reference signs denote like elements, and overlapping description may be omitted.

An optical device according to embodiments of the present disclosure is described below to implement the technical ideas, and no limitation is indicated to the embodiments of the present disclosure given below. For example, the shape of components, the relative positions of the arranged components, and the values of parameters are given by way of example in the following description, and the scope of the present disclosure is not limited thereto unless particularly specified. For example, the size of these elements and the relative positions of these elements may be exaggerated for purposes of illustration in the drawings.

An optical device according to an embodiment of the present disclosure includes a plurality of light emitters that irradiates an object with light, a detector that detects the light reflected by the object and outputs a signal based on the reflected light, and an output unit that outputs the data of the degree of inclination of the object obtained based on an output signal output from the detector.

The object according to the present embodiment is, for example, a human eye. As the eye is inclined toward the line of vision or line of sight of a subject, the optical device detects the degree of inclination of the eye, and outputs line-of-vision direction information that indicates the line-of-vision direction of the subject. The data of the degree of inclination of the eye includes not only the information that directly indicates the angle of inclination but also the information about an angle of inclination other than the angle of inclination of the eyeball.

For example, the line-of-vision direction information that is output from the optical device is used by an eye tracking devices, an optometric devices, a user-condition estimation apparatus, or a driver-assistance system. Alternatively, the line-of-vision direction information that is output from the optical device is used to correct the position of the projected image or the image data according to the line-of-vision when an image is projected onto a retina or the like by, for example, a retinal projection display device and a head-mounted display (HMD).

In such an optical device, when an object such as a live subject is irradiated with light in parallel from a plurality of light sources including, for example, a semiconductor laser, the radiation intensity of the light that is emitted to the object increases. For this reason, there is room for improvement in terms of the safety for the object and the utilization efficiency of the irradiation light.

According to embodiments of the present disclosure, the light that is emitted from the light emitter is temporally modulated by a code having orthogonality, and the multiple light emitters include a first light emitter and a second light emitter. Moreover, the first light emitter emits the light at a timing different from a timing at which the second light emitter emits the light. Due to such a configuration, the light is not emitted from all of the multiple light sources to the object in parallel. Accordingly, the reflected light that is reflected by the object can be detected with high accuracy while preventing an increase in the radiation intensity of the light emitted to the object and improving the level of safety for the object and the utilization efficiency of light.

In the following description, the line-of-sight detection device according to the present embodiment, which is mounted on a spectacle-shaped supporting structure and detects, as a line-of-vision direction, the degree of angle of inclination of an eye of a subject wearing the spectacle-shaped supporting structure, serves as an optical device. The eye of a subject according to the present embodiment serves as an object or a three-dimensional object. The line-of-vision direction according to the present embodiment indicates the degree of inclination of the object or a three-dimensional object.

In the present embodiment, the description is given in view of the right eye of human, but the same applies to the left eye of human. Alternatively, a pair of line-of-sight detection devices according to the present embodiment may be applied to both eyes, respectively.

First Embodiment

Firstly, a configuration of a line-of-sight detection device 10 according to a first embodiment of the present disclosure is described.

FIG. 1 is a diagram illustrating a configuration of a line-of-sight detection device 10 according to a first embodiment of the present disclosure.

As illustrated in FIG. 1, the line-of-sight detection device 10 according to the present embodiment includes a light source 1, a concave mirror 2, a photodetector 3, and a processor 100.

The light source 1, the concave mirror 2, and the photodetector 3 according to the present embodiment are attached to an optical-system base 4. The optical-system base 4 is fixed to a spectacle frame 22 provided for a spectacle-shaped supporting structure 20 that includes a spectacle lens 21 and the spectacle frame 22 in a tiltable manner through a ball joint 4a.

With the use of the ball joint 4a, the inclination of the optical-system base 4 can be adjusted as desired. The ball joint 4a that makes up a fine-tuning mechanism or fine-adjustment mechanism may adopt, for example, a fixing method using a mechanical force acting between the spherical structure and its outer structure and a fixing method using a magnetic force acting between a polarized or magnetized spherical structure and a metallic opening structure.

The spectacle-shaped supporting structure 20 can be attached to the head of a subject. When the spectacle-shaped supporting structure 20 is worn by a subject, the optical system that is provided with the light source 1, the concave mirror 2, and the photodetector 3 gets close to the eyeball 30 and is placed in front of the eye.

The light source 1 is a vertical-cavity surface-emitting laser (VCSEL) array in which a plurality of vertical-cavity surface-emitting laser (VCSEL) devices are two-dimensionally arranged, and can drive each one of the VCSEL devices on a one-by-one basis. A minimum unit of the VCSEL devices that are driven on a one-by-one basis may be referred to as a light emitter in the following description. Each light emitter emits a laser beam having directivity and a finite spread angle.

In the present embodiment, the laser beam that is emitted from the light source 1 is given as an example of light. Moreover, one VCSEL device according to the present embodiment serves as a light emitter, and the light source 1 according to the present embodiment serves as a plurality of light emitters that can emit laser beams that are temporally modulated based on a code having orthogonality.

Note also that the light source 1 is not limited to a vertical-cavity surface-emitting laser (VCSEL) array as long as it includes a plurality of light emitters that emit light. For example, a plurality of laser diodes (LDs), a plurality of semiconductor lasers, or a plurality of light-emitting diodes (LEDs) that emit a laser beam may be two-dimensionally arranged on a plane to make up the light source 1. Alternatively, a plurality of pulsed laser beam sources that emit a pulsed laser beam may make up the light source 1. Further, a plurality of types of light sources may be combined to make up the light source 1. The VCSEL can be easily integrated on a two dimensional plane. For this reason, the size of the VCSEL can be reduced when the VCSEL is mounted on a wearable device.

Preferably, the wavelength of the laser beam that is emitted from the light source 1 is within wavelengths of near-infrared light, which is invisible light such that the visual recognition of a subject whose line of sight is detected will not be interrupted. However, no limitation is intended thereby, and the laser beam that is emitted from the light source 1 may be visible light.

The laser beam L0 that is emitted from the light source 1 propagates in the space ahead of the eyes toward the concave mirror 2 in a direction approximately parallel to the face of a subject who wears a spectacle-shaped supporting structure 20 or the lens surface of the spectacle lens 21 worn by a subject. The laser beam L0 is diverging light that propagates while widening the diameter of beam by diffraction at the opening of the light emitter in the light source 1. The divergence angle of the diverging light can be controlled by the shape of the opening of the light emitter. The laser beam L0 propagates while diverging, and enters the concave mirror 2.

In the present embodiment, the light source 1 has a configuration in which a plurality of light emitters are two-dimensionally arranged on one substrate. However, no limitation is indicated thereby, and the number of substrates on which the multiple light emitters are arranged is not necessarily one. For example, the light source 1 may include a first substrate and a second substrate different from the first substrate. When the first light emitter is disposed on the first substrate and the second light emitter is disposed on the second substrate, the first substrate and the second substrate may be arranged in parallel.

The concave mirror 2 according to the present embodiment that serves as a focusing and reflecting unit has a reflection plane with curvature. Moreover, the concave mirror 2 reflects the incident laser beam L0, and irradiates the eyeball 30 with the focused laser beam L1. The focused laser beam L1 is incident on the eyeball 30 near the pupil 31. The center of curvature of a concave surface of the concave mirror 2 is located at a position deviating from the optical axis of an optical path from the light source 1 to the concave mirror 2, and an optical system that includes the light source 1, the concave mirror 2, and the photodetector 3 makes up a so-called off-axis optical system.

In FIG. 1, the concave mirror 2 that serves as a focusing and reflecting unit is given by way of example. However, no limitation is intended thereby, and for example, a configuration in which a convex lens and a plane mirror are combined, a wavefront-controlling element that uses a hologram, a diffractive-optical element may be adopted as long as it can concentrate the light.

The line-of-sight detection device 10 according to the present embodiment may include a concentrating unit that has a function to concentrate the light but does not have a function to reflect the light in place of the focusing and reflecting unit such as the concave mirror 2. For example, in the configuration as illustrated in FIG. 1, the light source 1 and a focusing optical element such as a convex lens or a microlens array may be arranged at the position of the photodetector 3 in place of the photodetector 3, and the photodetector 3 may be arranged at the position of the concave mirror 2 in place of the concave mirror 2.

If an anamorphic aspherical surface having different curvature is used as the concave surface of the concave mirror 2 in two directions that are orthogonal to each other on a plane and intersect with the optical axis of the focused laser beam L1, the diameter of the reflected laser beam L2, i.e., the focused laser beam L1 reflected by the eyeball 30, can be further reduced, and the beams can be shaped in an isotropic state. In the present embodiment, the reflected laser beam L2 according to the present embodiment serves as a reflected light.

The angle of incidence of the focused laser beam L1 on the eyeball 30 is adjusted such that the focused laser beam L1 will be incident on the center of the pupil 31 of the eyeball 30 at a predetermined angle under plus-sight conditions. The light source 1 can emit a laser beam L0 from each one of the multiple light emitters. The multiple laser beams L0 that are emitted from the light source 1 are emitted to a plurality of portions of the eyeball 30, or the multiple laser beams L0 that are emitted from the light source 1 are emitted to the eyeball 30 at a plurality of angles.

The surface of the pupil or cornea of the eyeball 30 according to the present embodiment serves as a projection plane, and is transparent as containing moisture. Typically, the surface of the pupil or cornea of the eyeball 30 has a reflectance of about 2 to 4%. The focused laser beam L1 that is incident on a point of the eyeball 30 near the pupil 31 is reflected by the eyeball 30 at a point of reflection on the surface of the pupil 31, and the reflected laser beam L2 propagates toward the photodetector 3. For the sake of explanatory convenience, in the following description, the surface of the eyeball 30 may be referred to as an eyeball 30, or the surface of the pupil 31 may be referred to as a pupil 31. Moreover, the surface of the cornea 32 may be referred to as a cornea 32.

Furthermore, the projection plane is not limited to the eyeball 30, and the present embodiment can be applied to any object that is a three dimensional object having curvature.

In the line-of-sight detection device 10, the intervals at which the multiple light emitters are arranged in the light source 1, the radius of curvature of the concave mirror 2, and the installed position are adjusted such that only one of the multiple laser beams L0 emitted from the multiple light emitters of the light source 1 will finally reach and be incident on the photodetector 3 depending on the degree of inclination of the eyeball 30.

The photodetector 3 according to the present embodiment serves as a detector that detects the light reflected by the object and outputs a signal based on the reflected light. The photodetector 3 may be, for example, a single-pixel photodetector (PD) that outputs a signal indicating the radiation intensity of the received light or a position sensitive detector (PSD) that can output both a signal indicating the radiation intensity of the received light and a signal indicating the position of the reflected laser beam L2 incident on the photodetector 3.

The arrangement of the concave mirror 2 and the photodetector 3 is not limited to the arrangement as illustrated in FIG. 1 as long as only one of the multiple laser beams L0 emitted from the multiple light emitters of the light source 1 will finally reach and be incident on the photodetector 3 depending on the degree of inclination of the eyeball 30. As long as the configuration satisfies the above, a deflection optical element may be provided between the eyeball 30 and the photodetector 3. The photodetector 3 is not limited to the position sensitive detector, and may be an imaging element such as a charge coupled device (CCD) or a complementary metal oxide semiconductor (CMOS).

The use of a position sensitive detector as the photodetector 3 is more preferable because the reflected light reflected by the eyeball 30 can be detected with high sensitivity based on the data of the radiation intensity of light and the line-of-vision direction can be detected with a high degree of precision based on the position of the light emitter in the light source 1 and the position at which the reflected laser beam L2 is incident on the position sensitive detector.

The processor 100 outputs a control signal to sequentially cause the multiple light emitters of the light source 1 to emit light. The processor 100 receives an output signal from the photodetector 3 and executes a process of estimating the line-of-vision direction. For example, the processor 100 can be disposed on a spectacle frame 22

The reflected laser beam L2 incident on the photodetector 3 originates from the laser beam L0 emitted from one of the multiple light emitters included in the light source 1, and such a relation between the reflected laser beam L2 and the light emitter differs depending on the line-of-vision direction. Accordingly, the processor 100 can estimate the line-of-vision direction based on the output signal output from the photodetector 3 and the position of the light emitter in the light source 1.

The estimation of the line-of-vision direction is performed using the position of the light emitter in the light source 1, the position of the reflected laser beam L2 incident on the photodetector 3, and a predetermined eye model.

In the present embodiment, the light source 1 has a plurality of light emitters and can perform high-speed time modulation. The line-of-sight detection device 10 time-modulates the laser beam emitted by the light source 1 according to the encoding pattern having orthogonality, and extracts components having the encoding pattern suitable for the incident laser beam from the output signals from the photodetector 3. Accordingly, the influence of the non-modulated light from external environment can be removed to improve the signal-to-noise (S/N) ratio of the output signal. This is preferable when the line-of-vision direction is detected under bright situations bright, and the radiation intensity of the focused laser beam L1 emitted to the eyeball 30 can be reduced.

In the line-of-sight detection device 10 according to the present embodiment, the multiple light emitters that are included in the light source 1 are instructed to emit light sequentially. Due to such a configuration, the radiation intensity of the focused laser beam L1 emitted to the eyeball 30 can be reduced compared with cases in which the multiple light emitters are instructed to emit light in parallel. When all of the multiple light emitters are instructed to emit light in parallel, it is necessary to prepare a plurality of light source driving circuits such as light-source modulation units whose number corresponds to the number of the light emitters. By contrast, in the line-of-sight detection device 10 according to the present embodiment, it is not necessary to prepare such a large number of light source driving circuits, and the light emitters are instructed to emit light on a one-by-one basis. Moreover, the light source driving circuits can be implemented in a small size and light weight.

In FIG. 1, an optical system and a processor are attached to the spectacle frame 22. However, no limitation is intended thereby, and for example, a head-mounted display or a head-gear type supporting structure may be adopted.

A hardware configuration of the processor 100 is described below with reference to FIG. 2.

Figure 2:
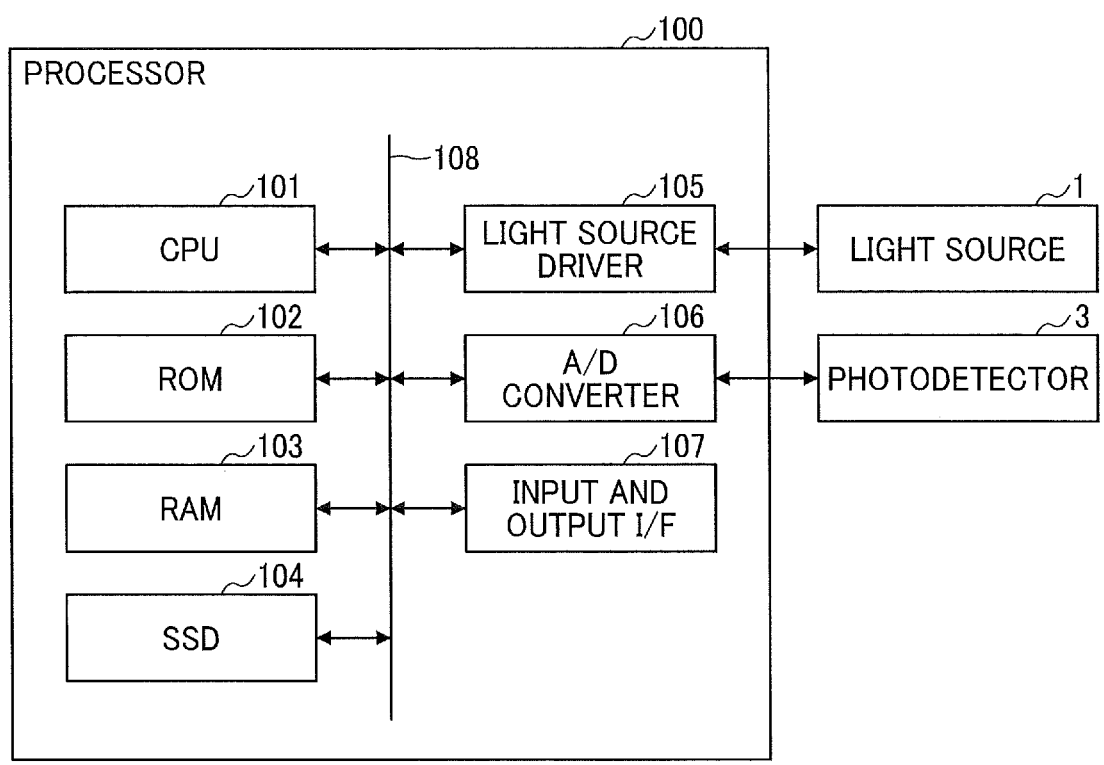
FIG. 2 is a block diagram of a hardware configuration of a processor according to the first embodiment of the present disclosure.

FIG. 2 is a block diagram of a hardware configuration of the processor 100 according to the present embodiment.

As illustrated in FIG. 2, the processor 100 includes a central processing unit (CPU) 101, a read only memory (ROM) 102, a random access memory (RAM) 103, and a solid state drive (SSD) 104. The processor 100 according to the present embodiment includes a light source driver 105, an analog-to-digital (A/D) converter 106, and an input and output interface (I/F) 107. These elements of the processor 100 are coupled to each other through a system bus B such that data or signals can be exchanged.

The CPU 101 loads into the RAM 103 a program or data from a storage device such as the ROM 102 and the SSD 104 and performs processes. Accordingly, the controls or functions of the entirety of the processor 100, as will be described later in detail, are implemented. Some of or the entirety of these functions of the CPU 101 may be implemented by electronic circuit such as an application specific integrated circuit (ASIC) and a field-programmable gate array (FPGA).

The ROM 102 is a read-only nonvolatile semiconductor memory or storage device that can store a computer program or data even when the power is switched off. The ROM 102 stores a computer program or data that is executed when the processor 100 starts up, such as a basic input/output system (BIOS), the settings of the operating system (OS), and the settings of the network. The RAM 103 is a volatile semiconductor memory or storage device that stores data or a computer program on a temporary basis.

The SSD 104 is a nonvolatile memory that stores various kinds of data or a program used to execute the processes performed by the processor 100. The SSD 104 may be a hard disk drive (HDD).

The light source driver 105 according to the present embodiment is an electric circuit that is electrically coupled to the light source 1 and outputs a driving voltage to the light source 1 according to the control signals. The light source driver 105 can simultaneously or sequentially drive a plurality of light emitters provided for the light source 1 to emit light.

A rectangular wave, a sine wave, or a voltage waveform having a predetermined waveform can be used as the driving voltage, and the light source driver 105 can change the cycles or frequencies of such a voltage waveform to modulate the cycles of the driving voltage.

The A/D converter 106 is an electric circuit that is electrically coupled to the photodetector 3 and is used to convert the analog voltage signal Sen output from the photodetector 3 to output digital voltage data Dat.

The input and output interface 107 is circuitry to interface with an external device such as a personal computer (PC) or video equipment.

Figure 3:
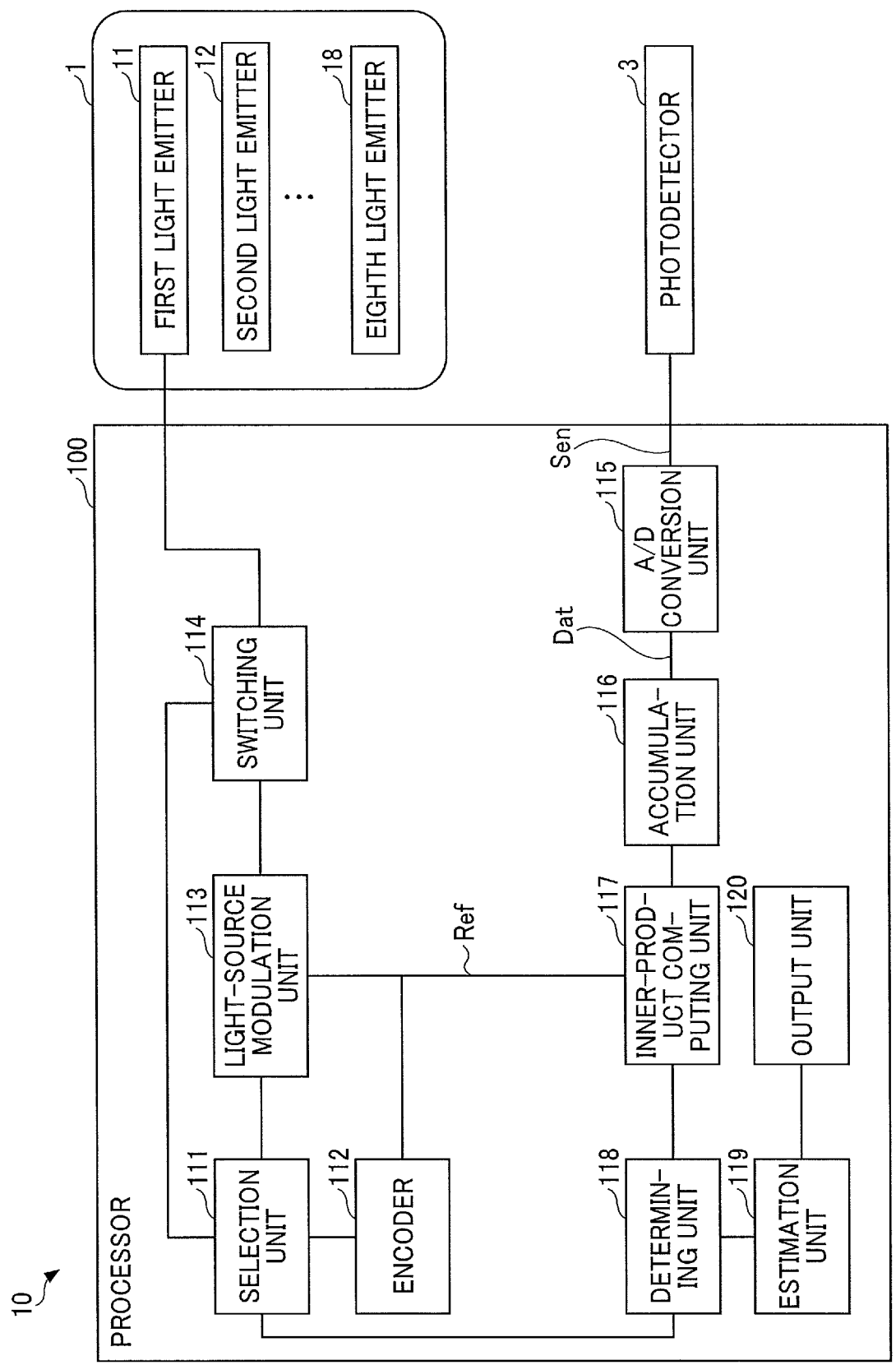
FIG. 3 is a block diagram of a functional configuration of a processor according to the first embodiment of the present disclosure.

FIG. 3 is a block diagram illustrating a functional configuration of the processor 100, according to the present embodiment.

As illustrated in FIG. 3, the processor 100 includes a selection unit 111, an encoder 112, a light-source modulation unit 113, a switching unit 114, an analog-to-digital (A/D) conversion unit 115, an accumulation unit 116, an inner-product computing unit 117, a determining unit 118, an estimation unit 119, and an output unit 120.

Regarding these elements of the processor 100, for example, each function of the selection unit 111, the encoder 112, the inner-product computing unit 117, the determining unit 118, and the estimation unit 119 is implemented as the CPU 101 of FIG. 2 executes a predetermined program stored in the ROM 102. For example, each function of the light-source modulation unit 113 and the switching unit 114 is implemented by the light source driver 105 of FIG. 2. For example, the function of the analog-to-digital conversion unit 115 is implemented by the analog-to-digital converter 106 of FIG. 2, and the function of the accumulation unit 116 is implemented by the RAM 103 of FIG. 2. For example, the function of the output unit 120 is implemented by the input and output interface 107 of FIG. 2.

The light source 1 is provided with eight light emitters including a first light emitter 11, a second light emitter 12, a third light emitter 13, a fourth light emitter 14, a fifth light emitter 15, a sixth light emitter 16, a seventh light emitter 17, and an eighth light emitter 18, and the selection unit 111 according to the present embodiment selects which one of these eight light emitters is to emit light, and outputs the information about the selected light emitter to the switching unit 114. In the present embodiment, eight light emitters are included in the light source 1 by way of example. However, no limitation is indicated thereby, and the number of light emitters may be any appropriate selectable number as long as there are a plurality of light emitters.

The encoder 112 according to the present embodiment selects an encoding pattern that serves as a code having orthogonality, and outputs the data of the selected encoding pattern to the light-source modulation unit 113. The encoder 112 according to the present embodiment outputs the selected data of encoding pattern to the inner-product computing unit 117 as reference voltage data Ref to be used for the computation of inner product by the inner-product computing unit 117. A code that has orthogonality is, for example, a Hadamard code. In the present embodiment, the Hadamard code refers to a coding scheme used for error detection and correction of the signal.

Moreover, different encoding patterns are prepared in advance according to the position of the light emitter of the light source 1, and are stored in, for example, the SSD 104 as illustrated in FIG. 2. The encoder 112 can refer to, for example, the SSD 104 to obtain an encoding pattern corresponding to the position of the light emitter selected by the selection unit 111.

The light-source modulation unit 113 modulates a driving current for driving the light source 1 based on the data of encoding pattern input from the encoder 112, and outputs the modulated driving current to the light emitter selected by the selection unit 111 through the switching unit 114.

The switching unit 114 performs switching such that the driving current by the light-source modulation unit 113 is output to the light emitter selected by the selection unit 111. For example, the functionality of the switching unit 114 is implemented by a demultiplexer. In the present embodiment, such a demultiplexer is included in the light source driver 105.

The analog-to-digital conversion unit 115 according to the present embodiment that has received the reflected laser beam L2 converts the output signal Sen, which is output from the photodetector 3, into a digital voltage data Dat, and outputs the obtained digital voltage data Dat to the accumulation unit 116. The accumulation unit 116 accumulates the digital voltage data Dat input from the analog-to-digital conversion unit 115 for one cycle of the encoding pattern. The light source 1 continues to emit light according to the encoding pattern until the digital voltage data Dat for one cycle of the encoding pattern is accumulated in the accumulation unit 116.

The inner-product computing unit 117 according to the present embodiment refers to the accumulation unit 116 to obtain the digital voltage data Dat for one cycle of the encoding pattern, and computes the inner product of the digital voltage data Dat and the reference voltage data Ref input from the encoder 112.

The determining unit 118 determines whether or not the photodetector 3 has received the reflected laser beam L0 of the focused laser beam L1 by the eyeball 30 irradiated with the focused laser beam L1 based on the laser beam L2 emitted by the light source 1, based on the value of inner product which is the inner product calculation result by the inner-product computing unit 117. More specifically, when the value of inner product is larger than a predetermined threshold, the determining unit 118 determines that the reflected laser beam L2 is received by the photodetector 3. When the value of inner product is equal to or smaller than the predetermined threshold, the determining unit 118 determines that the reflected laser beam L2 is not received by the photodetector 3.

Preferably, an appropriate value is set in advance as the predetermined threshold as above in view of, for example, the brightness of an area around the line-of-sight detection device 10, and the reflectance or shape of the eyeball 30 of a subject who uses the line-of-sight detection device 10.

The estimation unit 119 according to the present embodiment estimates the line-of-vision direction by computation, based on the position of the light emitter of the light source 1, which is detected based on the output signal Sen output from the photodetector 3. When the photodetector 3 is a position sensitive detector, the estimation unit 119 obtains the line-of-vision direction information by estimating the line-of-vision direction by computation based on the position of the light emitter in the light source 1 and the position of the reflected laser beam L2 incident on the photodetector 3, which are detected based on the output signals Sen output from the photodetector 3. The estimation unit 119 outputs the obtained line-of-vision direction information to an external device through the output unit 120.

The output unit 120 may output the data of the degree of inclination of the object obtained based on the output signal Sen output from the photodetector 3.

The external device according to the present embodiment may be, for example, a retinal projection display device, a head-mounted display (HVD), or an optometric device each of which makes use of the line-of-vision direction information obtained by the line-of-sight detection device 10. However, no limitation is intended thereby, and the output unit 120 may output the line-of-vision direction information to an external device such as a communication device coupled to a personal computer (PC), a storage device, and the Internet.

In the present embodiment, among the eight light emitters included in the light source 1, the light emitters selected by the selection unit 111 are caused to sequentially emit light on a one-by-one basis. When the eight light emitters are caused to emit light in parallel, the eight focused laser beams L1 that are emitted to the eyeballs 30 are added up. Accordingly, the radiation intensity of the focused laser beams L1 may increase, and the level of safety for the eyeballs 30 may decrease. Only some of the laser beams that are emitted by the eight respective light emitters is used to detect the line-of-vision direction, and the rest of laser beams is not used to detect the line-of-vision direction. Accordingly, the utilization efficiency of laser beams with which the eyeball 30 is irradiated to detect the line-of-vision direction decreases. In other words, as a result, the ratio of the number of laser beams used for detection to the number of emitted laser beams decreases.

The multiple light emitters that are selected by the selection unit 111 are instructed to sequentially emit light on a one-by-one basis. As a result, an increase in the radiation intensity of the focused laser beams L1 that are emitted to the eyeball 30 can be prevented, and a decrease in the level of safety for the eyeball 30 and a decrease in the utilization efficiency of light in the line-of-vision direction can be prevented. When the eight light emitters are caused to emit light in parallel, eight drive circuits are required for the eight light emitters. However, the number of drive circuits can be reduced if the multiple light emitters are instructed emit light sequentially on a one-by-one basis.

The eight light emitters according to the present embodiment do not have to emit light sequentially on a one-by-one basis, but are satisfactory as long as all of the eight light emitters do not emit light in parallel. In other words, the multiple light emitters include the first light emitter 11 and the second light emitter 12, and it is desired that the timing at which the laser beam L0 is emitted by the first light emitter 11 be different from the timing at which the laser beam L0 is emitted by the second light emitter 12.

For example, four adjacent ones of the eight light emitters may sequentially emit light in two different times, or two neighboring ones of the eight light emitters may sequentially emit light in four different times. Alternatively, two adjacent ones of the eight light emitters may sequentially emit light for the first time, and three adjacent ones of the eight light emitters may sequentially emit light for the second time. Subsequently, two adjacent ones of the eight light emitters may sequentially emit light for the third time, and one of the eight light emitters may sequentially emit light for the fourth time. However, from the viewpoint of increasing the resolution of the detection of the position of the light emitter that emits the laser beam L0, it is desired that each of the light emitters emit light sequentially in eight different times. In the present embodiment, the eight light emitters that are included in the light source 1 are instructed to emit light sequentially. Due to such a configuration, the first light emitter 11 emits the light at a timing different from a timing at which the second light emitter 12 emits the light.

The processes to be executed by the processor 100 are described below with reference to FIG. 4.

Figure 4:
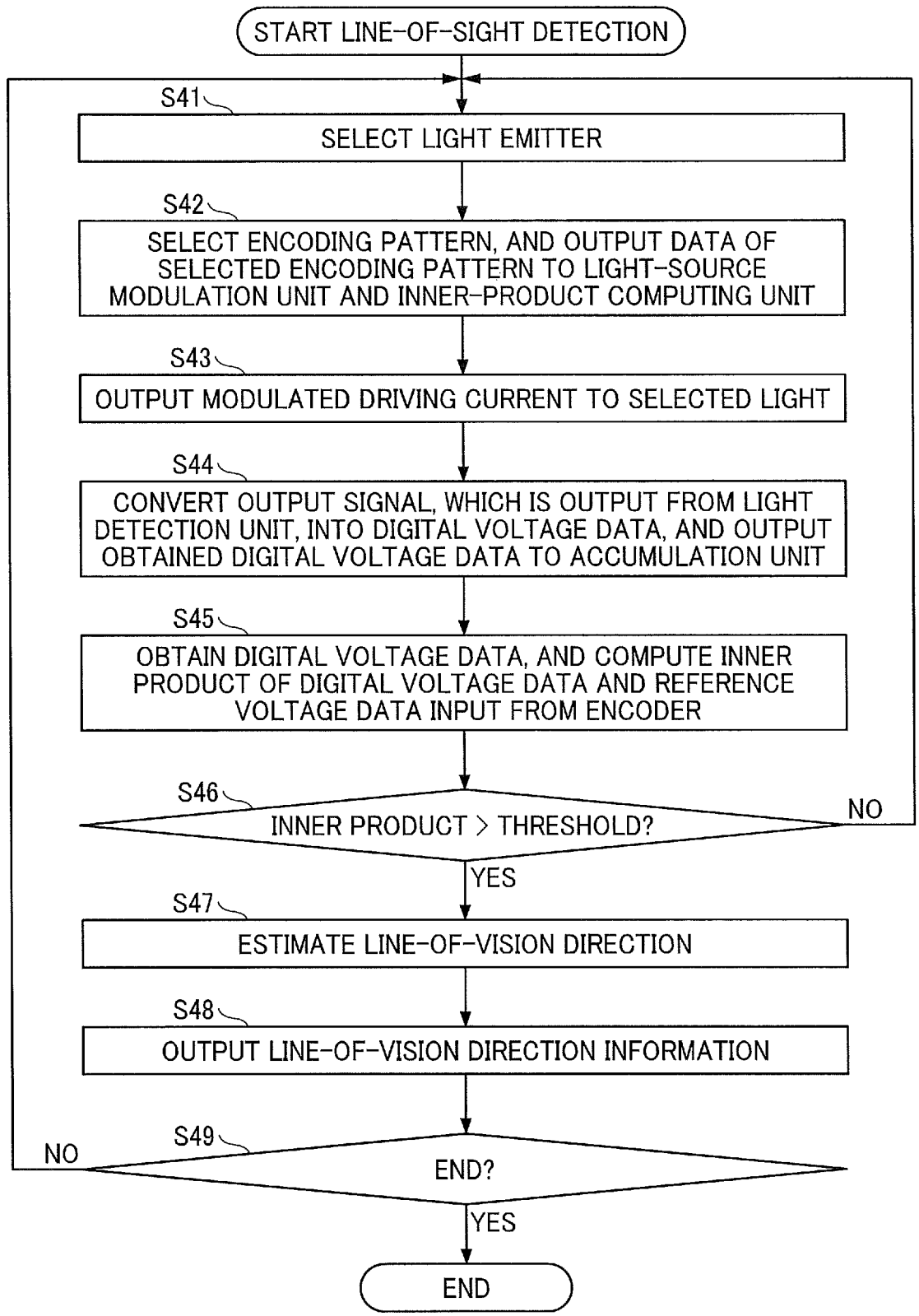
FIG. 4 is a flowchart of the processes that are performed by a processor according to an embodiment of the present disclosure.

FIG. 4 is a flowchart of the processes that are performed by the processor 100, according to the present embodiment.

More specifically, FIG. 4 illustrates the processes that are performed by the processor 100, which are triggered by the start of line-of-sight detection by the line-of-sight detection device 10, according to the present embodiment. For example, the line-of-sight detection by the line-of-sight detection device 10 starts when a control panel or operation panel of the line-of-sight detection device 10 receives a user's operation to start the line-of-sight detection by the line-of-sight detection device 10.

Firstly, in a step S41, the selection unit 111 according to the present embodiment selects which one of the eight light emitters included in the light source 1 is to emit light, and outputs the information about the selected light emitter to the encoder 112.

Subsequently, in a step S42, the encoder 112 selects an encoding pattern as a code that has orthogonality, and outputs the data of the selected encoding pattern to the light-source modulation unit 113. The encoder 112 according to the present embodiment outputs the generated data of encoding pattern to the inner-product computing unit 117 as reference voltage data Ref to be used for the computation of inner product by the inner-product computing unit 117.

Subsequently, in a step S43, the light-source modulation unit 113 modulates the driving current for driving the light source 1 based on the data of the selected encoding pattern input from the encoder 112, and outputs the modulated driving current to the light emitter selected by the selection unit 111 through the switching unit 114. The light emitter according to the present embodiment emits a laser beam L0 according to the input driving current.

Subsequently, in a step S44, the analog-to-digital conversion unit 115 according to the present embodiment converts the output signal Sen, which is output from the photodetector 3 that has received the reflected laser beam L2, i.e., the focused laser beam L1 reflected by the eyeball 30, into a digital voltage data Dat, and outputs the obtained digital voltage data Dat to the accumulation unit 116. The accumulation unit 116 accumulates the digital voltage data Dat input from the analog-to-digital conversion unit 115 for one cycle of the encoding pattern.

Subsequently, in a step S45, the inner-product computing unit 117 refers to the accumulation unit 116 to obtain the digital voltage data Dat for one cycle of the encoding pattern, and computes the inner product of the digital voltage data Dat and the reference voltage data Ref input from the encoder 112.

Subsequently, in a step S46, the determining unit 118 determines whether or not the value of inner product calculated by the inner-product computing unit 117 is greater than a predetermined threshold.

When it is determined that the value of inner product calculated by the inner-product computing unit 117 is greater than the threshold in the step S46 ("YES" in the step S46), the processor 100 shifts the process to a step S47. When it is determined that the value of inner product calculated by the inner-product computing unit 117 is equal to or less than the threshold in the step S46 ("NO" in the step S46), the processor 100 shifts the process to the step S41.

When the process shifts from the step S46 to the step 41, the selection unit 111 sequentially selects a different one of the eight light emitters that has not yet selected. For example, when the first light emitter 11 is selected in the step S41 for the first time, the selecting unit 111 selects the second light emitter 12 in the step S41 for the second time. In the step S41 for the ninth time after the process have gone through the step S41 eight times, the selection unit 111 returns to the first light emitter 11 and selects the first light emitter 11 again. As a result, the eight light emitters that are included in the light source 1 are instructed to emit light sequentially.

Subsequently, in a step S47 the estimation unit 119 estimates the line-of-vision direction by computation, based on the position of the light emitter of the light source 1, which is detected based on the output signal Sen output from the photodetector 3. When the photodetector 3 is a position sensitive detector, the estimation unit 119 obtains the line-of-vision direction information by estimating the line-of-vision direction by computation based on the position of the light emitter in the light source 1 and the position of the reflected laser beam L2 incident on the photodetector 3, which are detected based on the output signals Sen output from the photodetector 3.

Subsequently, in a step S48, the output unit 120 outputs the line-of-vision direction information obtained by the estimation unit 119 to an external device through the output unit 120.

Subsequently, in a step S49, the processor 100 according to the present embodiment determines whether or not to terminate the processes. For example, the line-of-sight detection device 10 determines to terminates the processes when an operation to end is received from a user of the line-of-sight detection device 10 through, for example, a control panel or operation panel of the line-of-sight detection device 10.

When it is determined that the processes are to be terminated in the step S49 "YES" in the step S49), the processor 100 terminates the processes. On the other hand, when it is determined that the processes are not to be terminated "NO" in the step S49), the step returns to the step S41, and the processor 100 repeats the processes in the step S41 and the following steps.

When the process shifts from the step S49 to the step 41, the selection unit 111 selects a predetermined light emitter such as the first light emitter 11 among the eight light emitters as an initial state. In such cases, the same light emitter as the light emitter that has previously emitted light is instructed to emit light. In other words, as long as the output signal Sen is detected, the same light emitter emits light.

As described above, the processor 100 can implement the line-of-sight detection processes to be performed by the line-of-sight detection device 10.

The encoding pattern is described below with reference to FIG. 5A and FIG. 5B.

Figure 5B:
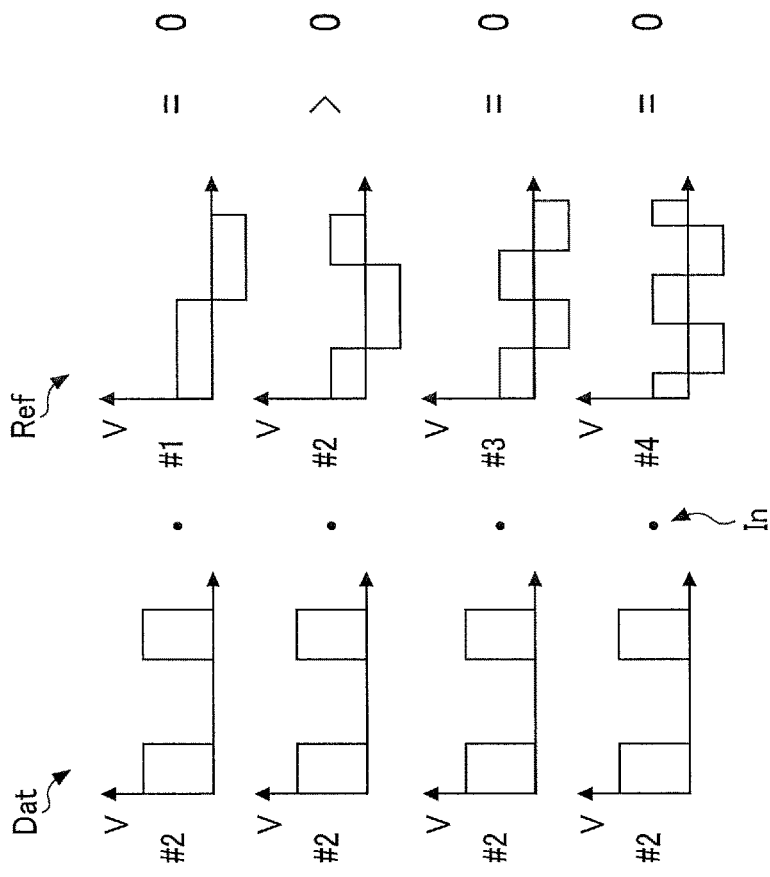
FIG. 5A and FIG. 5B are diagrams each illustrating Hadamard codes according to an embodiment of the present disclosure.
Figure 5A:
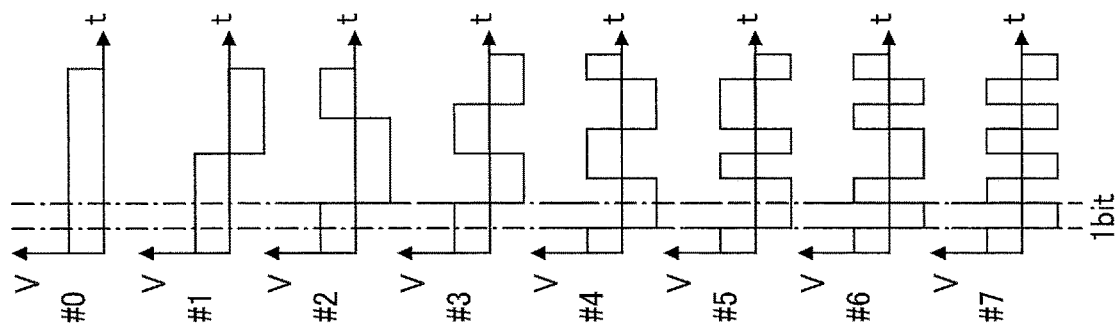

FIG. 5A and FIG. 5B are diagrams each illustrating Hadamard codes that serve as encoding patterns, according to an embodiment of the present disclosure.

More specifically, FIG. 5A is a diagram illustrating encoding patterns according to an embodiment of the present disclosure, and FIG. 5B is a diagram illustrating the computation of inner products, according to an embodiment of the present disclosure.

In the related art, a square matrix whose elements are 1 or −1 and whose row vectors are orthogonal to each other is called a Hadamard matrix. By way of example, an 8×8 Hadamard matrix H8 is given below as the first equation.

$$H_8 = \begin{pmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{pmatrix} \quad \text{First Equation}$$

Each row vector in the Hadamard matrix may be referred to as a Hadamard coding pattern in the following description. Each element of the Hadamard coding pattern is represented in units of bit.

FIG. 5A illustrates an 8-bit Hadamard coding pattern. More specifically, eight Hadamard coding patterns of #0 to #7 are illustrated. FIG. 5B illustrates the decoding of the detection signal encoded by the 8-bit Hadamard code. In each of the graphs illustrated in FIG. 5A and FIG. 5B, the horizontal axis denotes the time t, and the vertical axis denotes the voltage V in one of the digital voltage data Dat or the reference voltage data Ref.

Dat in FIG. 5B denotes the digital voltage data obtained by the analog-to-digital (A/D) conversion performed on the output signal Sen by the analog-to-digital conversion unit 115. Ref in FIG. 5B denotes the reference voltage data. The reference voltage data Ref is Hadamard data of encoding pattern selected by the encoder 112 and output to the inner-product computing unit 117.

As each encoding pattern has orthogonality, when the inner product of the encoded digital voltage data Dat and the reference voltage data Ref is computed, the value of inner product becomes a value greater than 0 only when the digital voltage data Dat and the reference voltage data Ref are generated from the same encoding pattern. Based on the above properties and characteristics, the encoded signal can be decoded.

In the present embodiment described with reference to FIG. 5B, when both the digital voltage data Dat and the reference voltage data Ref have the same Hadamard encoding pattern of #2, the value of inner product is greater than 0 In the other cases, the digital voltage data Dat and the reference voltage data Ref are different from each other, and thus the value of the inner product is 0.

In the line-of-sight detection device 10 according to the present embodiment, the light-source modulation unit 113 temporally modulates the laser beam L0 emitted from the multiple light emitters of the light source 1 according to the Hadamard coding In such temporal modulation, the light-source modulation unit 113 turns on the laser beam L0 when the element of the Hadamard coding pattern indicates 1, and turns off the laser beam L0 when the element of the Hadamard coding pattern indicates −1. Turning off the laser beam L0 is implemented by replacing the −1 element of the Hadamard coding pattern with 0. As the first row of the Hadamard matrix where all the elements are 1 is not used for encoding, a noise whose change in time is significantly slower than the cycle of modulation can be removed.

In FIG. 5A and FIG. 5B, the digital voltage data Dat in which the element −1 is replaced with 0 is illustrated as a Hadamard coding pattern.

In the present embodiment, the reason why decoding can be performed even when the −1 element of the Hadamard coding pattern is replaced with 0 will be described. Assuming that each row vector of the N×N Hadamard matrix HN is $h_k$, where k denotes an integer satisfying $0 \leq k < N$, the N×N Hadamard matrix HN can be expressed in the second equation given below.

$$H_N = (h_0, h_1, \ldots, h_{N-1})^T \quad \text{Second Equation}$$

T in the second equation denotes the transpose.

The radiation intensity I of the laser beam L0 that is modulated by the Hadamard coding pattern in which the elements of −1 are replaced with 0 can be expressed in the third equation given below.

$$I = I_0 \times \frac{h_0 + h_i}{2} + I_{nz} h_0 \quad \text{Third Equation}$$

$I_0$ in the third equation denotes the radiation intensity of the laser beam L0. In the third equation, a pattern $h_i$, where i denotes an integer satisfying "$1 \leq I \leq N-1$," other than $h_0$, is used as the Hadamard coding pattern. Also, $I_{nz}$ denotes the radiation intensity of noise light.

Assuming that $h_m$, where m denotes an integer satisfying $i < m < N-1$), is used as a reference signal, it is understood that as a result of the computation of inner product, the $h_0$ component in the third equation becomes 0 and the value of inner product becomes a value equal to or greater than 0 only when i=m. Accordingly, the radiation intensity $I_{nz}$ of the noise light can be removed, and only the desired output signal Sen can be detected.

When I=m, the inner product is computed and obtained as follows.

$$h_i \times h_m = N$$

In such cases, the signal-to-noise (S/N) ratio improves as the number of bits or the number of elements of the Hadamard coding pattern increases.

Figure 6A:
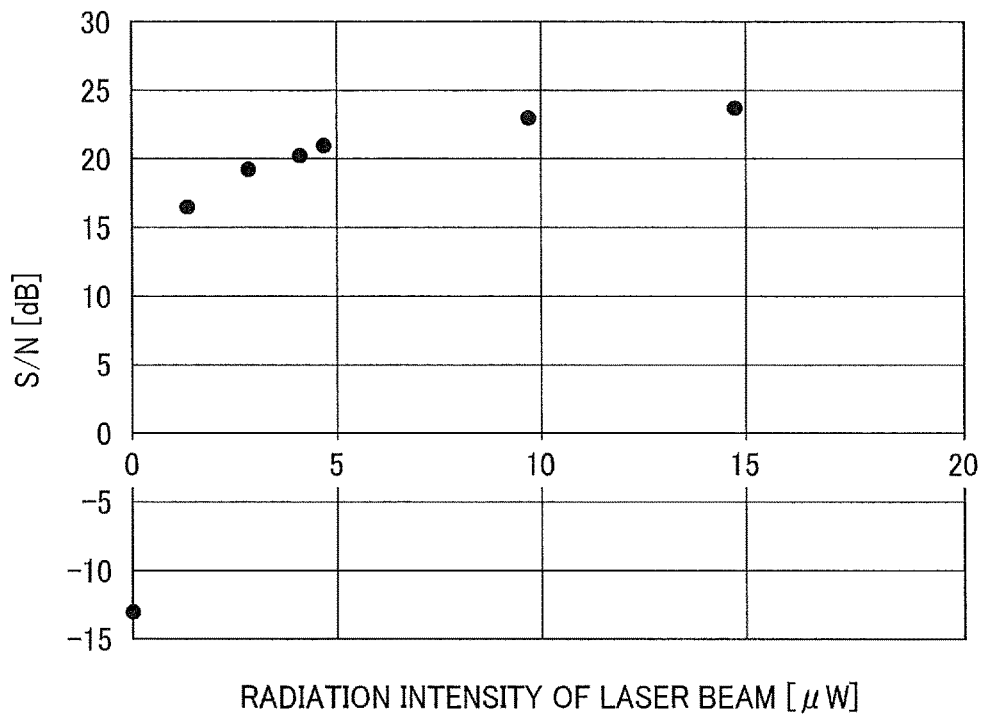
FIG. 6A is a diagram illustrating experimental results of weak light detection, according to an embodiment of the present disclosure.

FIG. 6A is a diagram illustrating experimental results of weak light detection using a Hadamard encoding pattern, according to an embodiment of the present disclosure.

In FIG. 6A, the horizontal axis indicates the radiation intensity of the laser beam emitted from the VCSEL that serves as the light emitter, and the vertical axis indicates the signal-to-noise (S/N) ratio of the output signals output from the position sensitive detector that serves as the photodetector. It is to be noted that the signal-to-noise (S/N) ratio is a value computed by 10×log, which indicates the standard deviation divided by an average value.

In the experiment where detection is performed, switching on and off of the light emission from the VCSEL is repeated according to the digital voltage data output from a personal computer (PC). As a result, the laser beam that is emitted from the light emitter was subjected to Hadamard encoding. The oscillation wavelength of the used VCSEL used is about 940 nanometers (nm).

An output signal that is output from the position sensitive detector was subjected to analog-to-digital (A/D) conversion, and is input to the personal computer (PC) as the digital voltage data. After the digital voltage data was accumulated a plurality of times in accordance with the number of elements of the Hadamard coding pattern, the inner product was computed by the software processing of a personal computer (PC). A set of processing that includes the detection by the position sensitive detector and the computation of inner product of the digital voltage data was processed ninety-five times, and the average value and standard deviation of the values of inner products were separately calculated. Then, the signal-to-noise (S/N) ratio is computed based on these obtained values. As the Hadamard coding pattern, a 16-bit coding pattern (1010101010101010) was used.

The horizontal axis in FIG. 6A indicates what is obtained by measuring the radiation intensity of light immediately in front of the position sensitive detector with a power meter in two patterns and calculating the value of difference between the output signal output from the position sensitive detector and the output signal output from the power meter. The above two patterns indicate cases when the VCSEL is turned on and cases when the VCSEL is turned off. The origin point of the horizontal axis corresponds to a result of the computation of inner product when the VCSEL is turned off. The power meter measured about 35 microwatts (μM) when the VCSEL was turned off. In other words, the radiation intensity of light under the indoor illumination environments was about 35 microwatts (μM).

From the results in FIG. 6A, it is understood that a laser beam with the radiation intensity of about 1 microwatt (μM) can be detected with high sensitivity under indoor illumination environments of about 35 microwatts (μM). More specifically, when the radiation intensity of laser beam is about 1.4 microwatts (μM), the average value of the values of inner products was about forty-five times higher than the standard deviation.

Figure 6B:
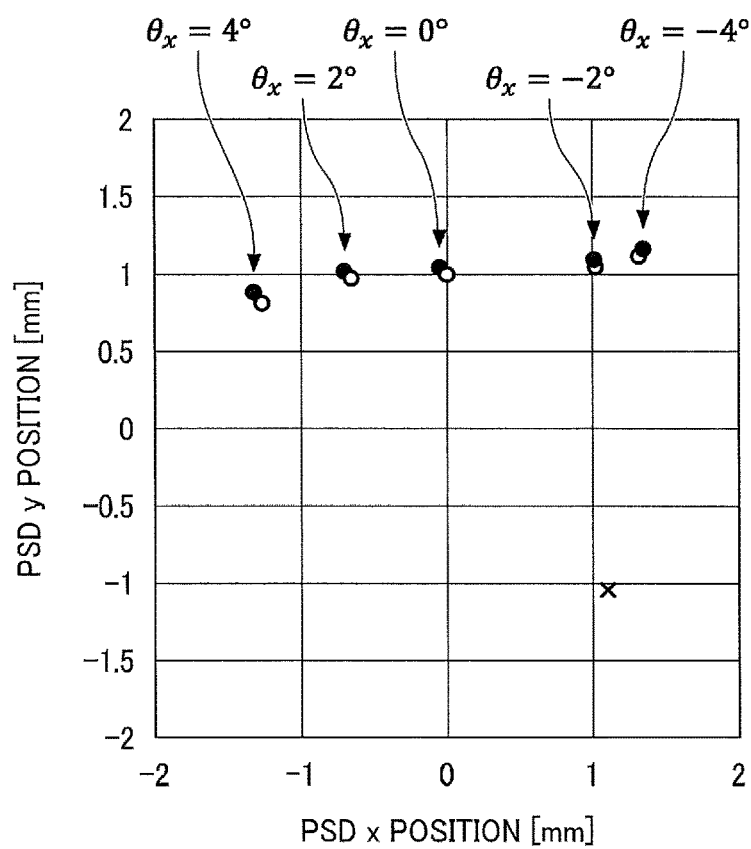
FIG. 6B is a diagram illustrating experimental results of detection in a line-of-vision direction using a Hadamard encoding pattern, according to an embodiment of the present disclosure.

FIG. 6B is a diagram illustrating experimental results of detection in a line-of-vision direction using a Hadamard encoding pattern, according to an embodiment of the present disclosure.

In FIG. 6B, the horizontal axis and the vertical axis indicate the X-coordinate and Y-coordinate of the beam spot position output from the photodetector 3, respectively.

The output signal that is from the photodetector 3 when the degree of inclination θx of the eye model in the horizontal direction is changed was subject to the analog-to-digital (A/D) conversion, and the resultant data is input to a personal computer (PC) as digital voltage data. After the digital voltage data was accumulated a plurality of times in accordance with the number of elements of the Hadamard coding pattern, the inner product was computed by the software processing of a personal computer (PC). Assuming that the degree of inclination is 0 degree when the eyeball 30 faces the front, the degree of inclination θx in the eye model with reference to the horizontal direction was changed in increments of 2 degrees within the range of ±4 degrees. In FIG. 6B, the results that are obtained when the degrees of inclination θx are −4, −2, 0, 2, and 4 degrees, respectively, are illustrated.

Experimental methods in FIG. 6B are described below.
First Step

Firstly, measurement is performed under darkroom environments without Hadamard encoding, as indicated by the plots of black circles in FIG. 6B.
Second Step Secondly, measurement is performed under environments where the light emitted from a halogen lamp is adopted as background light, without Hadamard encoding, as indicated by the plot of a cross (x) in FIG. 6B.
Third Step Finally, measurement is performed under environments where the light emitted from a halogen lamp is adopted as background light, with Hadamard encoding, as indicated by the plots of open circles in FIG. 6B.

The radiation intensity of the signal light was about 1 microwatt (μW), and the radiation intensity of the halogen lamp was about 150 μW. As the Hadamard coding pattern, a 16-bit coding pattern (1001100110011001) was used.

As illustrated in FIG. 6B, under darkroom environments in which the intensity of background light is small and can be ignored, the coordinate values that are indicated by the output signals output from the photodetector 3 changed according to the degree of inclination of the eyeball. However, under bright environments in which radiation is present as the background light, a change in the coordinate value that are indicated by the output signals output from the photodetector 3 ceased regardless of the changes in the degree of inclination of the eyeball. In order to handle such a situation, the signal light is encoded with a Hadamard pattern. As a result, regardless of the environments in which radiation by a halogen lamp is present, the coordinate values that are indicated by the output signals output from the photodetector 3 changed according to the degree of inclination of the eyeball 30. Accordingly, it is understood that even under environments in which the intensity of the light signal is smaller than the radiation intensity of the background light by $1/150$, the degree of inclination of the eyeball 30 can be measured with a high degree of accuracy while keeping the intensity of the signal light extremely weak.

The processes of labelling by the estimation unit 119 are described below. The estimation unit 119 can also decode the output signal Sen output from the photodetector 3 using a label corresponding to the encoding pattern of the laser beam L0 and the position of one of the multiple light emitters, which are provided for the light source 1, that has emitted the laser beam L0 to be emitted to the eyeball 30 as the focused laser beam L1.

By so doing, the position of the light emitter can be detected based on the value of inner product and the output signal Sen, without inputting the data of the selected encoding pattern from the encoder 112. The processes with a label that are performed by the estimation unit 119 are described below.

As the reference voltage data Ref, what are expressed by the fourth equation and the fifth equation given below are used.

$$I_r = \frac{1}{N}\sum_{k=1}^{N-1} L_k h_k \quad \text{Fourth Equation}$$

$$\tilde{I}_r = \frac{1}{N}\sum_{k=1}^{N-1} h_k \quad \text{Fifth Equation}$$

In the fourth equation and the fifth equation, N denotes the number of elements of the Hadamard coding pattern, and $L_k$ denotes a label coefficient. Moreover, $h_k$ denotes a Hadamard coding pattern vector.

$L_k$ gives the final output result for the output signal Sen. More specifically, when the inner product of the digital voltage data Dat based on the output signal Sen expressed in the third equation and the reference voltage data Ref expressed in the fourth equation is calculated, the sixth equation is obtained as follows. In a similar manner to the above, when the inner product of the digital voltage data Dat based on the output signal Sen and the reference voltage data Ref expressed in the fifth equation is calculated, the seventh equation is obtained as follows.

$$I_{s,i} \cdot I_r = \frac{I_0}{2}\sum_{k=1}^{N-1} L_k \delta_{i,k} = L_i \times \frac{I_0}{2} \quad \text{Sixth Equation}$$

$$I_{s,i} \cdot \tilde{I}_r = \frac{I_0}{2} \quad \text{Seventh Equation}$$

$\delta_{i,k}$ in the sixth equation denotes a Kronecker delta. The transformed data $S_i$ can be obtained by dividing the sixth equation by the seventh equation.

$$S_i = \frac{I_{s,i} \cdot I_r}{I_{s,i} \cdot \tilde{I}_r} = L_i \quad \text{Eighth Equation}$$

$L_k$ can be determined with reference to each Hadamard code. For example, $L_k$ may be equal to k or $2^k$. In particular, when it is determined that $L_k=2^k$, each bit of the digital voltage data Dat can be associated with each Hadamard coding pattern when the output signal that is output from the photodetector 3 was subject to the analog-to-digital (A/D) conversion.

Figure 7:
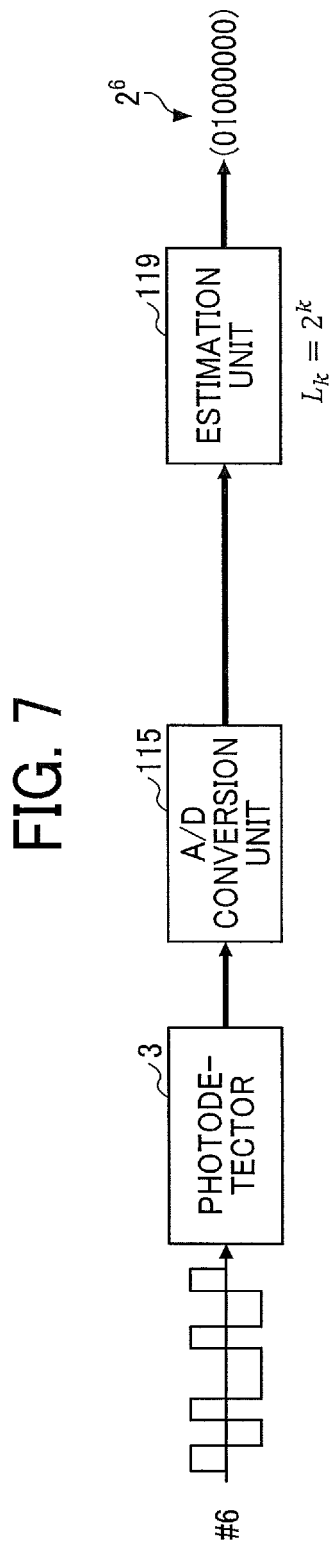
FIG. 7 is a diagram illustrating decoding processes using a label, according to an embodiment of the present disclosure.

FIG. 7 is a diagram illustrating decoding processes using a label, according to an embodiment of the present disclosure.

In FIG. 7, a Hadamard encoding pattern of #6 (1, −1, 1, −1, −1, 1, −1, 1) of the Hadamard code of 8 bit is used (see FIG. 4).

After the output signal Sen that is output from the photodetector 3 is subject to the analog-to-digital conversion by the analog-to-digital conversion unit 115, the estimation unit 119 performs decoding processes using a label. According to the eighth equation as given above, the output result is indicated by $L_k$. Accordingly, when the output result is expressed in binary, the bit that corresponds to the number of the Hadamard coding pattern is 1. Due to such a configuration, the position of the light emitter can be detected as the position where the bit is 1.

Some advantageous effects of the line-of-sight detection device 10 are described below.

Currently, technologies and products that are related to virtual reality (VR) and augmented reality (AR) attracts a lot of attention. In particular, the AR technology is expected to be applied not only to entertainment domain but also to a wide range of fields such as work support on the manufacturing floor and the clinical floor.

As a device or equipment that provides augmented reality (AR), glasses-type image display devices are under development. In particular, a retinal projection display that projects an image directly on a human retina has an advantage that it is not always necessary for the eyes to focus on the projected image. Due to such a configuration, a clear AR image can be viewed steadily while focusing the eyes on an object in the exterior world. Further, in combination with a line-of-sight detection technologies or eye tracking technologies used to track the line-of-vision direction of the subject, the angle of view of the display can be increased, and the displayed image can be operated or manipulated by the line of sight.

A line-of-sight detection device is known in the art that is configured to estimate the line-of-vision direction of an eye based on the position of reflected light of the emitted laser beam reflected by the eyeball. In such a configuration or structure, from the viewpoint of safety, it is desired that the radiation intensity of the laser beam emitted to the eyeball be weak. In view of such circumstances, a lock-in detector and a modulator that modulates the light emitted from the light emitter are used in order to detect the position of the reflected light with a high signal-to-noise (S/N) ratio.

However, the number of light emitters used in the configuration according to the related art is equal to the number of the lock-in detectors and the modulators. Accordingly, if the number of light emitters is increased in order to widen the range of line-of-sight detection, the size of the line-of-sight detection device tends to increase, and the degree of power consumption may increase.

In the lock-in detector, as the signal derived from the temporally modulated light is separated by the frequency, it is preferable that the frequency resolution is high in order to perform detection with high accuracy. However, as the detection time becomes longer according to the frequency resolution, it may be difficult to perform high-speed detection of the line-of-vision direction.

In order to detect the multiple weak optical signals in a separate manner without being affected by ambient noise, in the related, a plurality of weak optical signals are detected in a separate manner using the orthogonality of a pseudo-random sequence including a Hadamard code.

However, in such a configuration, the multiple laser beams are emitted from the multiple light emitters in parallel. Accordingly, the radiation intensity of the light that is emitted to the object such as an eyeball increases. For this reason, there is room for improvement in terms of the safety for the object and the utilization efficiency of the irradiation light.

In the present embodiment, the light source 1 that includes a plurality of light emitters and emits a laser beam or light temporally modulated based on an code having orthogonality, the photodetector 3 that outputs a signal based on the reflected laser beam (reflected light) L2 reflected by the eyeball (object) 30 irradiated with the focused laser beam L1 based on the laser beam L0, and the output unit 120 that outputs the line-of-vision direction information or the data of the degree of inclination of the object obtained based on the output signal Sen output from the photodetector 3 are provided.

A code that has orthogonality includes, for example, a Hadamard code.

The light source 1 includes the first light emitter 11 and the second light emitter 12, and the timing at which the laser beam L0 is emitted by the first light emitter 11 is different from the timing at which the laser beam L0 is emitted by the second light emitter 12.

Accordingly, the multiple focused laser beams L1 based on the multiple laser beams L0 emitted from the multiple light emitters are not emitted to the eyeball 30 in parallel. As a result, an increase in the radiation intensity of the focused laser beams L1 that are emitted to the eyeball 30 can be prevented, and a decrease in the level of safety for the eyeball 30 and a decrease in the utilization efficiency of light in the line-of-vision direction can be prevented.

In the present embodiment, the line-of-vision direction is estimated based on a signal that corresponds to the reflected laser beam L2, i.e., the focused laser beam L1 reflected by the eyeball 30 based on the laser beam L0 that is temporally modulated by a code having orthogonality, and the information about the line-of-vision direction obtained by estimation is output. Accordingly, the influence of the light from external environment can be removed to improve the signal-to-noise (S/N) ratio of the signal, and the reflected light L2 that is reflected by the eyeball 30 and is weak can be detected with high sensitivity. As a result, the level of safety for the eyeball 30 and the utilization efficiency of light can be enhanced, and the reflected light L2 that is reflected by the eyeball 30 can be detected with high sensitivity.

In the present embodiment, the output unit 120 outputs the line-of-vision direction information obtained based on the computed inner product of the output signals Sen output from the photodetector 3 and the encoding pattern of the laser beam L0 emitted from the light source 1. As a result, noise can be reduced and the reflected laser beam L2 from the eyeball 30 can be detected with high sensitivity by simple computation.

Further, in the present embodiment, the photodetector 3 can output the information about the position at which the reflected laser beam L2 reflected by the eyeball 30 is incident on the photodetector 3. Due to such a configuration, the line-of-vision direction can be detected with even higher accuracy based on the relative positions of the multiple light emitters and the position of the reflected laser beam L2 reflected by the eyeball 30.

The output signal Sen that is output from the photodetector 3 may be decoded using a label corresponding to the position of one of the multiple light emitters that has emitted the laser beam L0 and the encoding pattern of the laser beam L0 emitted from the light emitter. By so doing, the position of the light emitter can be detected based on the value of inner product and the output signal Sen output from the photodetector 3, without inputting the data of the selected encoding pattern from the encoder 112. As a result, a configuration or structure for emitting the laser beam and a configuration or structure for receiving the laser beam can separately be arranged, and the configuration or structure of the processor 100 can further be simplified.

In the present embodiment, the eyeball 30 is irradiated with the focused laser beam L1 concentrated by the concave mirror 2. However, no limitation is indicated thereby. The eyeball 30 may be directly irradiated with the laser beam L0 emitted from the light source 1, or the eyeball 30 may be irradiated with the converted laser beam L0 using an optical element other than the concave mirror 2.

Second Embodiment

A line-of-sight detection device 10a according to a second embodiment of the present disclosure is described below. In view of the embodiments of the present disclosure as described above, like reference signs denote like elements, and redundant description may be omitted where appropriate.

In the first embodiment as described above, there is a wide degree of freedom in the selection of the light emitter by the selecting unit 111 and the selection of the encoding pattern by the encoder 112. By way of example, a method is known in the art in which the encoding pattern expressed in the first equation is cyclically selected to select the light emitter and the encoding pattern.

However, such a method is not always efficient because the probability of an event A in which the coding pattern is successfully selected in one-time process is 1/N. N denotes the number of bits that makes up the coding pattern.

For this reason, in the present embodiment, one of the multiple light emitters is selected that emits the laser beam based on the light-emission probability distribution according to the use frequency of the light emitter, and one of the multiple encoding patterns is selected that encodes the laser beam based on the light-emission probability distribution (P2(A)) according to the use frequency of the encoding pattern.

Due to such a configuration, the appearance frequency of light emission not accompanied by detection of reflected light by the object is reduced, and the utilization efficiency of light emitted by the multiple light emitters is improved. Unnecessary detection of the position of the light emitter can be eliminated, and the line-of-sight detection can be performed at high speed.

Figure 8:
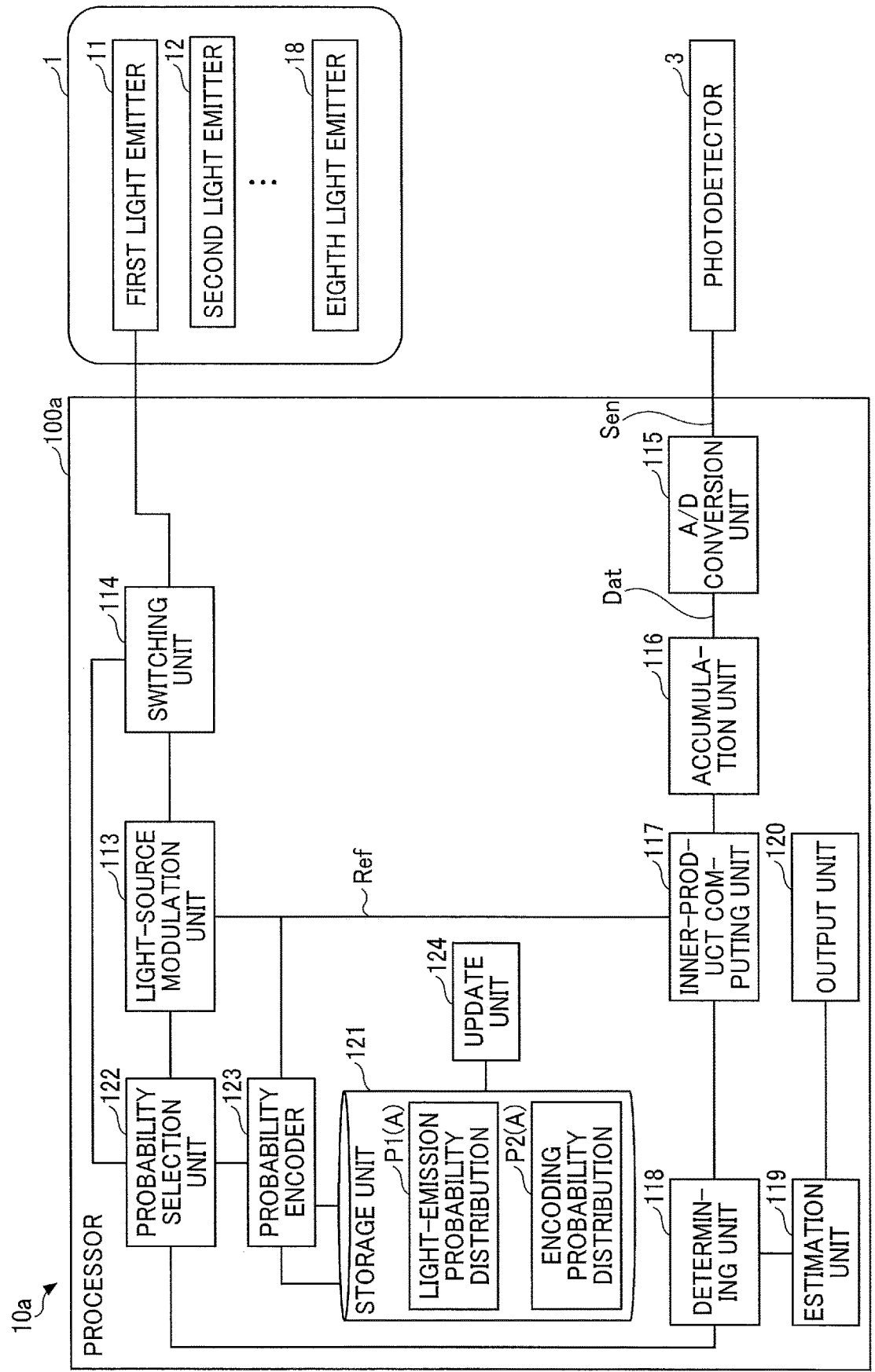
FIG. 8 is a block diagram of a functional configuration of a processor according to a second embodiment of the present disclosure.

FIG. 8 is a block diagram of a functional configuration of a processor 100a provided for the line-of-sight detection device 10a, according to a second embodiment of the present disclosure.

As illustrated in FIG. 8, the processor 100a according to the present embodiment includes a storage unit 121, a probability selection unit 122, a probability encoder 123, and an update unit 124.

Regarding these elements of the processor 100a, for example, the function of the storage unit 121 is implemented by the SSD 104 of FIG. 2, and each function of the probability selection unit 122, the probability encoder 123, the update unit 124 is implemented as the CPU 101 of FIG. 2 executes a predetermined program stored in one of the ROM 102 or the SSD 104.

The storage unit 121 stores a plurality of items of information including the light-emission probability distribution P1(A) and the encoding probability distribution P2(A). The light-emission probability distribution P1(A) is use frequency information of the light emitter used when the determining unit 118 determines that the photodetector 3 has received light in the past line-of-sight detection by the line-of-sight detection device 10a. In a similar manner to the above, the encoding probability distribution P2(A) is the use frequency information of the encoding pattern used when the determining unit 118 determines that the photodetector 3 has received light in the past line-of-sight detection by the line-of-sight detection device 10a.

When the determining unit 118 determines that the photodetector 3 has not received any light in the line-of-sight detection by the line-of-sight detection device 10a, the probability selection unit 122 selects the light emitter that is to emit the laser beam L0, based on a random number according to the light-emission probability distribution P1(A), and the probability encoder 123 selects an encoding pattern used to encode the laser beam L0, based on a random number according to the encoding probability distribution P2(A). As a result, the light emitter and the encoding pattern that are used at a relatively high frequency are selected on a priority basis.

After each of the probability selecting unit 122 and the probability encoder 123 has selected the light emitter and the encoding pattern, the update unit 124 updates each one of the light-emission probability distributions P1(A) and the encoding probability distributions P2(A). Such an update process may be performed according to a frequency distribution of a predetermined number of times, or may be achieved by updating the probability distribution by referring to Bayesian estimation theory. Further, in order not to lose the line-of-vision direction for a long time when the line-of-vision direction changes instantaneously, it is desired that the light emitter and the encoding pattern with a low frequency of occurrence also have a limited low probability.

Figure 9:
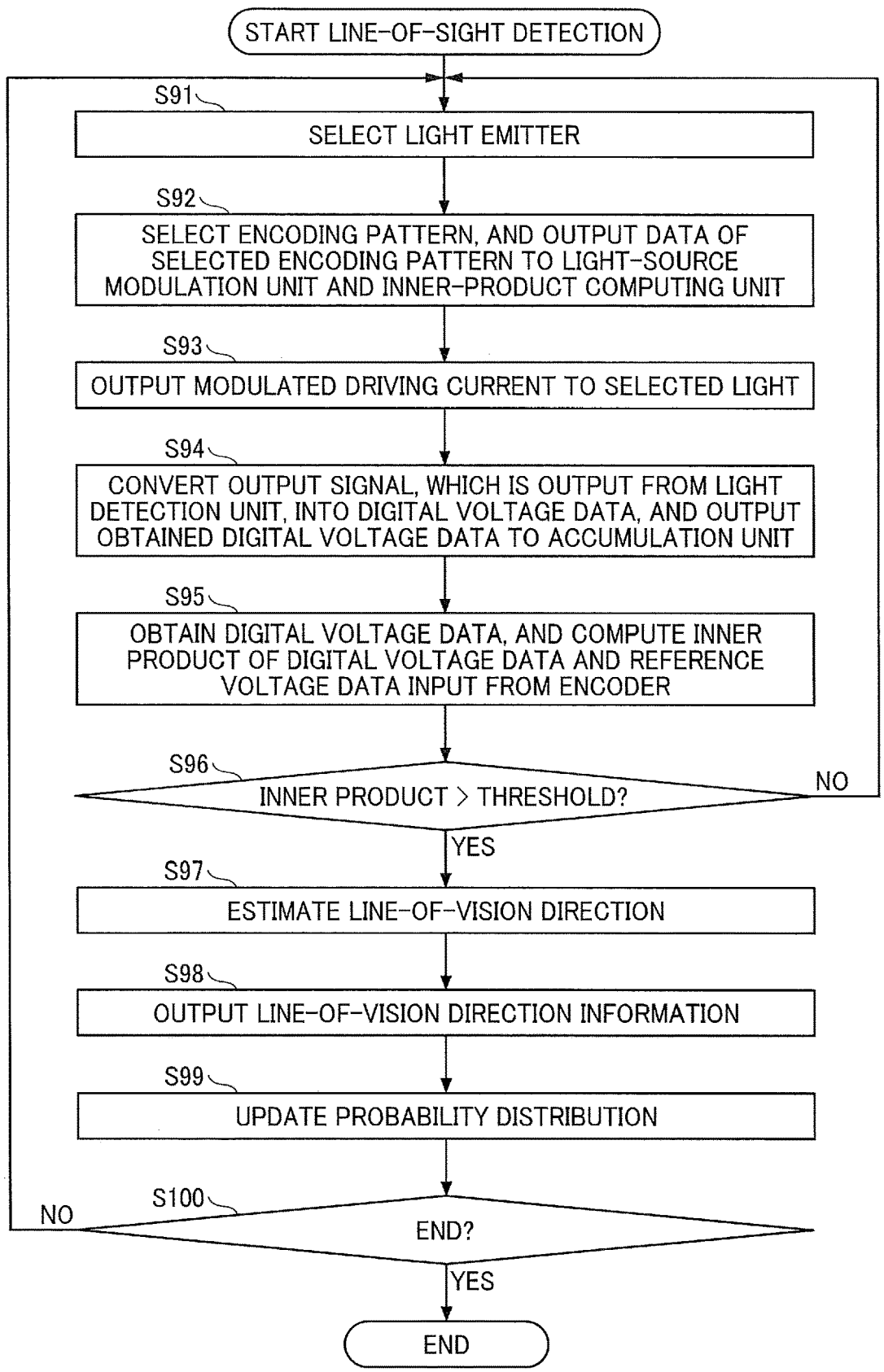
FIG. 9 is a flowchart of the processes that are performed by a processor according to a second embodiment of the present disclosure.

FIG. 9 is a flowchart of the processes that are performed by the processor 100a, according to the present embodiment.

The processes of the steps S93 to S98 in FIG. 9 are equivalent to the processes of the steps S43 to S48 in FIG. 4, respectively. Moreover, the processes of the step S100 in FIG. 9 are equivalent to the processes of the step S49 in FIG. 4. Thus, the overlapping descriptions are omitted in the present description with reference to FIG. 9, and the operations that are different from FIG. 4 are described.

Firstly, in a step S91, the probability selection unit 122 selects the light emitter based on a random number according to the light-emission probability distribution P1(A) stored in the storage unit 121.

Subsequently, in a step S92, the probability encoder 123 selects an encoding pattern based on a random number according to the encoding probability distribution P2(A) stored in the storage unit 121.

In a step S99, the update unit 124 updates each one of the light-emission probability distributions P1(A) and the encoding probability distributions P2(A).

As described above, the processor 100a can implement the line-of-sight detection processes to be performed by the line-of-sight detection device 10a.

As described above, in the present embodiment, the probability selection unit 122 selects the light emitter that emits the laser beam L0 based on the light-emission probability distribution P(A) according to the use frequency of the light emitter among the multiple light emitters included in the light source 1. Then, the probability encoder 123 selects one of the multiple encoding patterns is encodes the laser beam L0 based on the light-emission probability distribution P2(A) according to the use frequency of the encoding pattern.

Due to such a configuration, the appearance frequency of light emission not accompanied by detection of reflected light by the object can be reduced, and the utilization efficiency of light emitted by the multiple light emitters can be improved. Unnecessary detection of the position of the light emitter can be eliminated, and the line-of-sight detection can be performed at high speed.

Third Embodiment

A retinal projection display device 60 according to a third embodiment of the present disclosure is described below with reference to FIG. 10.

Figure 10:
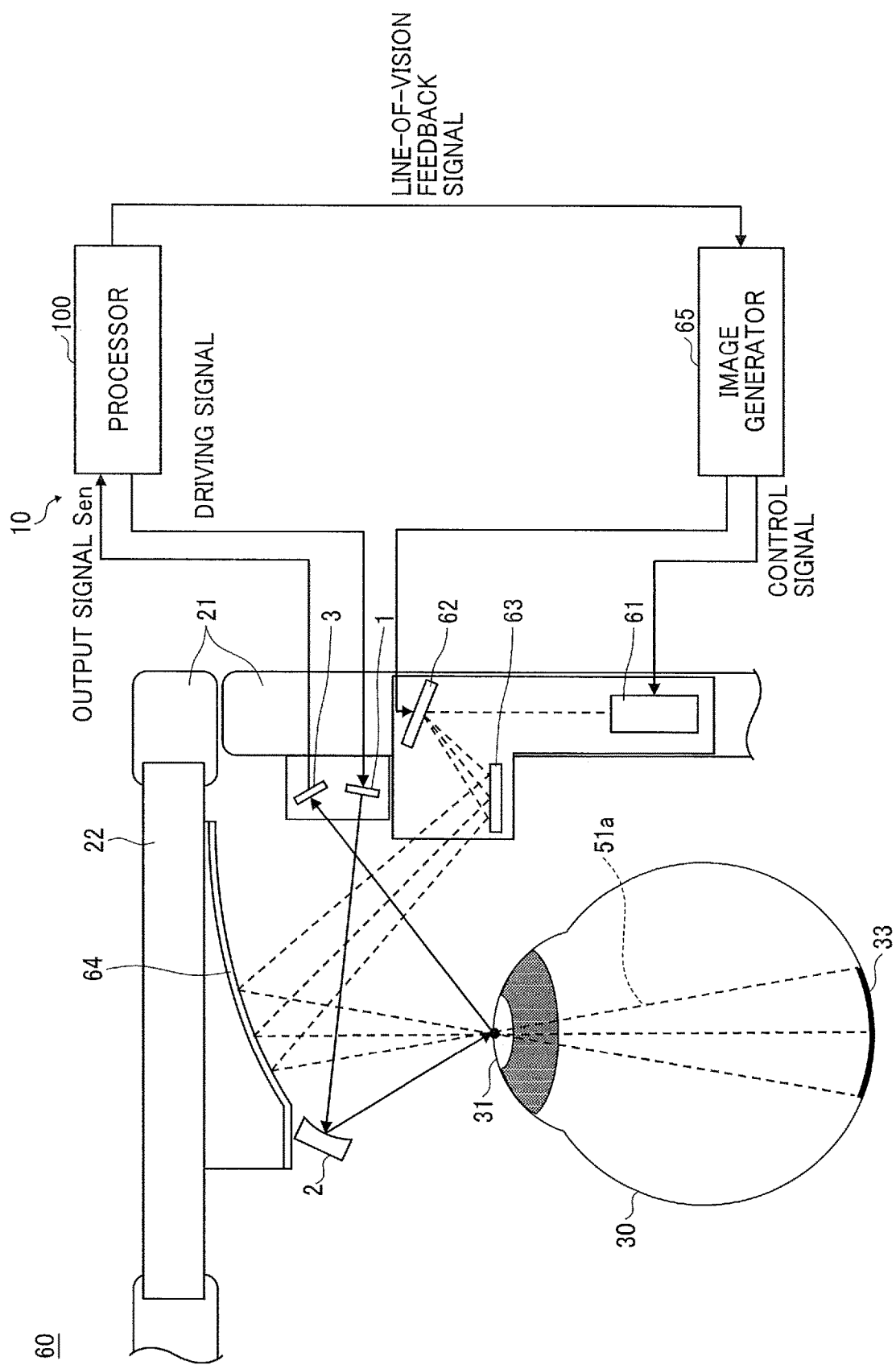
FIG. 10 is a diagram illustrating a configuration of a retinal projection display device according to a third embodiment of the present disclosure.

FIG. 10 is a diagram illustrating a configuration of the retinal projection display device 60 according to the second embodiment of the present disclosure.

As illustrated in FIG. 10, the retinal projection display device 60 includes a red, green, and blue (RGB) laser beam source 61, a scanning mirror 62, a plane mirror 63, a half mirror 64, an image generator 65, and the line-of-sight detection device 10 according to the first embodiment as described above.

The RGB laser beam source 61 according to the present embodiment temporally modulates the laser beam of three colors of RGB, and outputs the modulated laser beam. The scanning mirror 62 according to the present embodiment two-dimensionally scans the light emitted from the RGB laser beam source 61. The scanning mirror 62 is, for example, a micro-electromechanical systems (MEMS) mirror. However, the scanning mirror 62 is not limited to the MEMS mirror, and may be a polygon mirror, a galvano mirror, for example as long as it has a reflection unit that scans light. The MEMS mirror is advantageous in terms of reduction in size and weight. For example, a method of driving a MEMS mirror may be any desired method including an electrostatic method, a piezoelectric method, and an electromagnetic method.

The plane mirror 63 reflects the scanning light reflected by the scanning mirror 62 toward the half mirror 64. The half mirror 64 transmits some of the incident light, and reflects different some of the incident light toward the eyeball 30. The half mirror 64 that has a concave curved surface concentrates or converges the reflected light near the pupil 31 of the eyeball 30, and forms an image approximately at a position of the retina 33. As a result, an image that is formed by the scanning light is projected onto the retina 33. A light 61a that is indicated by a broken line in FIG. 10 is indicates the light used to form an image on the retina 33. The half mirror 64 does not need to have a one-to-one relation in the radiation intensity of light between the reflected light and transmitted light.

The line-of-sight detection device 10 sends to the image generator 65 a feedback signal indicating the inclination of the eyeball 30 in the line-of-vision direction.

The image generator 65 according to the present embodiment has a function to control the deflection angle of the scanning mirror 62 and a function to control the light emission of the RGB laser beam source 61. The image generator 65 receives a feedback signal indicating the line-of-vision direction from the line-of-sight detection device 10. Moreover, the image generator 65 controls the deflection angle of the scanning mirror 62 and the light emission of the RGB laser beam source 61 according to the line-of-vision direction detected by the line-of-sight detection device 10, and rewrites the angle of projection of the image or the image data. Due to such a configuration, an image that reflects the results of eye tracking, which indicate the changes in line-of-vision direction caused by eye motion, can be formed on the retina 33.

In the present embodiment, a configuration in which the retinal projection display device 60 is implemented as a head-mounted display that is a wearable device is described by way of example. However, the retinal projection display device 60 that is implemented as a head-mounted display (HMD) is not limited to a device directly worn on a human head, but may be a device indirectly worn on the human head having a member such as a holding part therebetween. For example, a binocular retinal projection display device that includes a pair of retinal projection display devices 60 for both the right and left eyes may be adopted.

In the present embodiment, the retinal projection display device 60 includes the line-of-sight detection device 10. However, no limitation is indicated thereby, and the retinal projection display device 60 may include the line-of-sight detection device 10a.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

For example, in the above-described embodiments of the present disclosure, the device that detects the degree of inclination of the eyeball 30 serves as an optical device. However, no limitation is intended thereby, and for example, an optical device may be mounted on a robot hand, and the degree of inclination of the robot hand according to the present embodiment that serves as the object may be detected.

Such a configuration can also be applied to an optometric device that has a function to detect the degree of inclination of an eye and the position a pupil or cornea. The optometric device refers to a device capable of performing various kinds of examinations such as an eye test, an eye refractive power examination, an intraocular pressure examination, and an optical axial-length examination. The optometric device can perform non-contact examination on an eye, and includes a supporting unit configured to support the face of a subject, an optometric window, a display unit configured to stabilize the direction of the line of sight of an eye of a subject during the optometric examination, a controller, and a measurement unit. In order to increase the measurement precision of the measurement unit, a subject is requested to gaze at one point without moving the line of sight of an eye. More specifically, the subject is requested to fix his/her face to the supporting unit, and to gaze at an object displayed on the display unit through the optometry window. In so doing, an inclined-position detector for eyes of according to the embodiments of the present disclosure can be used to detect the inclined position of the eye. The inclined-position detector for eyes is arranged away from the measurement unit so as not to disturb measurement. The information about the inclined position or line-of-vision of the eye, which is obtained by the inclined-position detector of the eye, can be fed back to the controller, and measurement can be performed based on the information about the inclined position of the eye.

The line-of-sight detection device 10 according to the present embodiment may be applied to the user-condition estimation apparatus that estimates the condition of the subject based on one item of information about the degree of inclination of the eyeball 30, the pupil position, the cornea position, or the line-of-vision direction information. The term subject indicates a user of the state estimation apparatus.

The condition of a subject includes at least one of the level of fatigue of the subject and the level of attention of the subject. For example, the degree of fatigue of a subject is an index that indicates the magnitude of mental fatigue of the subject. For example, the degree of attention of a subject is an index that indicates the level of attention of the subject.

For example, a user-condition estimation apparatus that estimates the level of fatigue of the user includes a line-of-sight detection device 10, and a level-of-fatigue estimation unit that estimates the level of fatigue based on the subject's line-of-vision direction information detected by the line-of-sight detection device 10. The level-of-fatigue estimation unit according to the present embodiment serves as a condition estimation unit.

For example, a method of estimating the level of mental fatigue of a subject, using a level-of-fatigue estimation unit, is known in the art (see, for example, Tseng, V.WS., Valliappan, N., Ramachandran, V. et al. (2021). Digital biomarker of mental fatigue. npj Digit. Med. 4, 47). According to such a known method, the level of mental fatigue can be estimated by performing a task of tracking the path of an object displayed on a monitor with eyes for several minutes and measuring the motion of the line of sight during such tracking of path. According to the line-of-sight detection device 10, an increase in the radiation intensity of the light that is emitted to the object can be controlled, and the reflected light that is reflected by the object can be detected with high accuracy. Moreover, the level-of-fatigue estimation apparatus that has the line-of-sight detection device 10 can estimate the level of mental fatigue of the subject with a high level of safety and high degree of accuracy. For example, such a level-of-fatigue estimation apparatus may be provided with a notifying unit configured to provide a notification that prompts a subject to take a break based on the estimated degree of mental fatigue.

For example, the user-condition estimation apparatus that estimates the level of attention of the user includes a line-of-sight detection device 10, and an attentional level estimation unit that estimates the level of attention of the user based on the user's line-of-vision direction information detected by the line-of-sight detection device 10. The attentional level estimation unit according to the present embodiment serves as a condition estimation unit.

As a method of estimating the level of attention of a subject using an attentional level estimation unit, for example, a method is known in the art in which the micro vibration of the eyeball 30, which is referred to as microsaccades, is detected to estimate the level of attention of the subject based on the frequency of occurrence of such microsaccades. According to Pastukhov, A., & Braun J. (2010). Rare but precious: microsaccades are highly informative about attentional allocation. Vision Res. 2010 Jun. 11, 50(12), 1173-84, the involuntary eye movement during fixation indicates the micro vibration of the eyeball 30 with the amplitude of about ±3.0 degrees, which occurs when a subject watches or observes a certain object, and the microsaccades are known as the fast movement whose amplitude is relatively side among various kinds of involuntary eye movement during fixation. Moreover, it is known in the art that the frequency of occurrence of microsaccades correlates with the level of attention of a subject. The line-of-sight detection device 10 according to the present embodiment can measure the degree of inclination of the eyeball 30 at high speed and with a high degree of accuracy. Accordingly, the line-of-sight detection device 10 according to the above embodiments of the present disclosure can detect the microsaccades with a high degree of accuracy compared with the line-of-sight detection devices in the related art.

Accordingly, with the user-condition estimation apparatus that estimates the level of attention of a subject, an increase in the radiation intensity of the light that is emitted to the object can be controlled, and the reflected light that is reflected by the object can be detected with high accuracy. Moreover, the level of attention of the subject can be estimated with a high level of safety and high degree of accuracy.

The user-condition estimation apparatus that includes the line-of-sight detection device 10 can also be applied to a driver-assistance system. Such a driver-assistance system includes a user-condition estimation apparatus provided with the line-of-sight detection device 10, and an operation control unit that controls the operation or movement of a mobile object based on the level of attention of the subject estimated by the user-condition estimation apparatus. For example, when the level of attention of a subject that is estimated by the user-condition estimation apparatus is lower than a predetermined reference value, the operation control unit controls the operation mode of the mobile object such as a vehicle, so as to switch from the manual drive mode to the automatic drive mode. Due to the line-of-sight detection device 10, an increase in the radiation intensity of the light that is emitted to the object can be controlled, and the reflected light that is reflected by the object can be detected with high accuracy. Accordingly, the driver-assistance system can perform driver assistance with a high degree of accuracy and safety.

In such embodiments of the present disclosure, one item of information about the degree of inclination of the eyeball 30, the pupil position, the cornea position, or the line-of-vision direction information that are detected by the line-of-sight detection device 10 may be used by each one of the condition estimation unit that estimates the condition of a subject and the two or more image generators. Due to this configuration, an increase in the radiation intensity of the light emitted to the eyeball 30 of a subject can be reduced, and the reflection light that is reflected by the eyeball 30 can be detected with high sensitivity. Moreover, the size of the line-of-sight detection device 10 can be reduced.

For example, the degree of inclination of the eyeball 30, the pupil position, the cornea position, or the line-of-vision direction information that are detected by the line-of-sight detection device 10 may be used as a feedback signal for the image generator of the retinal projection display device, and may also be used to estimate the level of fatigue by the level-of-fatigue estimation unit of the level-of-fatigue estimation apparatus. In such cases, the image generator and the level-of-fatigue estimation unit, which are functional units, may be implemented by the same information processing apparatus, or may be implemented by separate information processing apparatuses.

The embodiments of the present disclosure also include a method of detecting the degree of inclination of a three-dimensional object. For example, the method of detecting the degree of inclination of the three-dimensional object includes a step of irradiating an object with light, using a plurality of light emitters, a step of detecting the light reflected by the object and outputting a signal based on the reflected light, using a detector, and a step of outputting data of a degree of inclination of the object obtained based on an output signal output from the detector. In the method of detecting the degree of inclination of the three-dimensional object, the light that is emitted from the light emitter is temporally modulated by a code having orthogonality, and the plurality of light emitters include a first light emitter and a second light emitter. Moreover, in the method of detecting the degree of inclination of the three-dimensional object, the first light emitter emits the light at a timing different from a timing at which the second light emitter emits the light. With such a method of detecting the degree of inclination of the three-dimensional object, functions similar to those implemented by the above line-of-sight detection device can be implemented.

Embodiments of the present disclosure includes a method of detecting a line of sight. For example, the method of detecting the line of sight includes a step of irradiating an object with light, using a plurality of light emitters, a step of detecting the light reflected by the object and outputting a signal based on the reflected light, using a detector, and a step of outputting data of a degree of inclination of the object obtained based on an output signal output from the detector. In the method of detecting the line of sight, the light that is emitted from the light emitter is temporally modulated by a code having orthogonality, and the plurality of light emitters include a first light emitter and a second light emitter. Moreover, in the method of detecting the line of sight, the first light emitter emits the light at a timing different from a timing at which the second light emitter emits the light. With such a method of detecting a line-of-sight, functions similar to those implemented by the above line-of-sight detection device can be implemented.

The numbers such as ordinal numbers and numerical values that indicates quantity are all given by way of example to describe the technologies to implement the embodiments of the present disclosure, and no limitation is indicated to the numbers given in the above description. The description as to how the elements are related to each other, coupled to each other, or connected to each other are given by way of example to describe the technologies to implement the embodiments of the present disclosure, and how the elements are related to each other, coupled to each other, or connected to each other to implement the functionality in the present disclosure is not limited thereby.

The functions according to the present embodiments described above can be realized by one or a plurality of processing circuits.

The processing circuit herein includes, for example, devices such as a processor that is programmed to execute software to implement functions, like a processor with electronic circuits, an application specific integrated circuit (ASIC) that is designed to execute the above functions, a digital signal processor (DSP), a field-programmable gate array (FPGA), and a circuit module known in the art.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An optical device comprising:
a plurality of light emitters configured to irradiate an object with light;
a detector configured to detect the light reflected by the object and output a signal based on the light reflected by the object; and
circuitry configured to output data of a degree of inclination of the object obtained based on an output signal output from the detector,
wherein the light emitted from the plurality of light emitters is temporally modulated by a code having orthogonality,
wherein the plurality of light emitters include a first light emitter and a second light emitter,
wherein the first light emitter emits the light at a timing different from a timing at which the second light emitter emits the light, and
wherein the circuitry is configured to output the data of the degree of inclination of the object estimated based on a computed inner product of the output signal and an encoding pattern of the light.

2. The optical device according to claim 1,
wherein the code includes a Hadamard code.

3. The optical device according to claim 1,
wherein the detector is configured to output a signal indicating a position of the light that is reflected by the object and is incident on the detector.

4. The optical device according to claim 1,
wherein the output signal is decoded using a label corresponding to an encoding pattern of the light and a position of one of the plurality of light emitters that has emitted the light.

5. A line-of-sight detection device comprising
the optical device according to claim 1,
wherein the object is an eye of a subject, and
wherein the optical device is configured to detect a degree of inclination of the eye of the subject as a line-of-vision direction of the subject.

6. A retinal projection display device comprising
the line-of-sight detection device according to claim 5.

7. A head-mounted display comprising
the line-of-sight detection device according to claim 5.

8. An optometric device comprising
the line-of-sight detection device according to claim 5.

9. An optical device comprising:
a plurality of light emitters configured to irradiate an object with light;
a detector configured to detect the light reflected by the object and output a signal based on the light reflected by the object; and
circuitry configured to output data of a degree of inclination of the object obtained based on an output signal output from the detector, wherein the light emitted from the plurality of light emitters is temporally modulated by a code having orthogonality, wherein the plurality of light emitters include a first light emitter and a second light emitter, wherein the first light emitter emits the light at a timing different from a timing at which the second light emitter emits the light, wherein the circuitry is configured to select one of the plurality of light emitters to emit the light based on a light-emission probability distribution according to use frequency of the selected one of the plurality of light emitters, and wherein the circuitry is configured to select one of a plurality of encoding patterns used to encode the light based on a light-emission probability distribution according to use frequency of the selected one of the plurality of encoding patterns.

10. A user-condition estimation apparatus comprising a line-of-sight detection device including an optical device configured to detect a degree of inclination of an object that is an eye of a subject as a line-of-vision direction of the subject, wherein the optical device includes a plurality of light emitters configured to irradiate the object with light, a detector configured to detect the light reflected by the object and output a signal based on the light reflected by the object, and circuitry configured to output data of a degree of inclination of the object obtained based on an output signal output from the detector, wherein the light emitted from the plurality of light emitters is temporally modulated by a code having orthogonality, wherein the plurality of light emitters include a first light emitter and a second light emitter, wherein the first light emitter emits the light at a timing different from a timing at which the second light emitter emits the light, and wherein the circuitry is configured to estimate a condition of the subject based on data of the line-of-vision direction detected by the line-of-sight detection device.

11. The user-condition estimation apparatus according to claim 10, wherein the circuitry is configured to estimate the condition of the subject based on a frequency of occurrence of micro vibration of an eye.

12. The user-condition estimation apparatus according to claim 10, wherein the condition of the subject includes at least one of a level of fatigue of the subject and a level of attention of the subject.

13. A driver-assistance system comprising the user-condition estimation apparatus according to claim 10, wherein the circuitry is configured to control operation or movement of a mobile object driven by the subject based on the condition of the subject estimated by the user-condition estimation apparatus.

14. A method of detecting a degree of inclination of a three-dimensional object, the method comprising:

irradiating an object with light, using a plurality of light emitters;

detecting the light reflected by the object and outputting a signal based on the light reflected by the object, using a detector; and outputting data of a degree of inclination of the object obtained based on an output signal output from the detector, wherein the light emitted from the plurality of light emitters is temporally modulated by a code having orthogonality, wherein the plurality of light emitters include a first light emitter and a second light emitter, wherein the first light emitter emits the light at a timing different from a timing at which the second light emitter emits the light, and wherein the data of the degree of inclination of the object is estimated based on a computed inner product of the output signal and an encoding pattern of the light.

15. A method of detecting a line of sight, the method comprising:

irradiating an object with light, using a plurality of light emitters;

detecting the light reflected by the object and outputting a signal based on the light reflected by the object, using a detector; and outputting data of a degree of inclination of the object obtained based on an output signal output from the detector, wherein the light emitted from the plurality of light emitters is temporally modulated by a code having orthogonality, wherein the plurality of light emitters include a first light emitter and a second light emitter, wherein the first light emitter emits the light at a timing different from a timing at which the second light emitter emits the light, and wherein the data of the degree of inclination of the object is estimated based on a computed inner product of the output signal and an encoding pattern of the light.

* * * * *